United States Patent
Tshouva et al.

(10) Patent No.: US 10,983,923 B2
(45) Date of Patent: *Apr. 20, 2021

(54) DYNAMIC MEMORY PROTECTION

(71) Applicant: Sternum Ltd., Tel Aviv (IL)

(72) Inventors: Natali Tshouva, Rishon LeZion (IL); Lian Granot, Rishon LeZion (IL)

(73) Assignee: Sternum Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/642,027

(22) PCT Filed: Oct. 2, 2019

(86) PCT No.: PCT/IL2019/051076
§ 371 (c)(1),
(2) Date: Feb. 26, 2020

(87) PCT Pub. No.: WO2020/089885
PCT Pub. Date: May 7, 2020

(65) Prior Publication Data
US 2020/0242238 A1  Jul. 30, 2020

Related U.S. Application Data

(60) Provisional application No. 62/751,774, filed on Oct. 29, 2018.

(51) Int. Cl.
G06F 21/56 (2013.01)
G06F 21/78 (2013.01)
(Continued)

(52) U.S. Cl.
CPC .......... G06F 12/1425 (2013.01); G06F 8/441 (2013.01); G06F 9/5016 (2013.01);
(Continued)

(58) Field of Classification Search
None
See application file for complete search history.

(56) References Cited

U.S. PATENT DOCUMENTS 6,832,302 B1 * 12/2004 Fetzer ............ G06F 21/52
711/154
7,752,459 B2   7/2010 Cowan et al.
(Continued)

FOREIGN PATENT DOCUMENTS

WO  WO 2012/131386  10/2012
WO  WO 2020/089885  5/2020

OTHER PUBLICATIONS

International Preliminary Report on Patentability dated Jan. 15, 2020 From the International Preliminary Examining Authority Re. Application No. PCT/IL2019/051076. (11 Pages).
(Continued)

*Primary Examiner* — Kambiz Zand
*Assistant Examiner* — Arezoo Sherkat

(57) ABSTRACT

Presented herein are methods and systems for adjusting code files to apply memory protection for dynamic memory regions supporting run-time dynamic allocation of memory blocks. The code file(s), comprising a plurality of routines, are created for execution by one or more processors using the dynamic memory. Adjusting the code file(s) comprises analyzing the code file(s) to identify exploitation vulnerable routine(s) and adding a memory integrity code segment configured to detect, upon execution completion of each vulnerable routine, a write operation exceeding from a memory space of one or more of a subset of most recently allocated blocks allocated in the dynamic memory to a memory space of an adjacent block using marker(s) inserted in the dynamic memory in the boundary(s) of each of the subset's blocks. In runtime, in case the write operation is
(Continued)

detected, the memory integrity code segment causes the processor(s) to initiate one or more predefined actions.

33 Claims, 3 Drawing Sheets

(51) Int. Cl.
| | |
|---|---|
| *G06F 21/54* | (2013.01) |
| *G06F 21/57* | (2013.01) |
| *G06F 21/64* | (2013.01) |
| *G06F 12/14* | (2006.01) |
| *G06F 12/02* | (2006.01) |
| *G06F 9/50* | (2006.01) |
| *G06F 8/41* | (2018.01) |
| *G06F 12/06* | (2006.01) |

(52) U.S. Cl.
CPC .......... *G06F 12/0238* (2013.01); *G06F 12/06* (2013.01); *G06F 21/54* (2013.01); *G06F 21/563* (2013.01); *G06F 21/577* (2013.01); *G06F 21/64* (2013.01); *G06F 21/78* (2013.01); *G06F 2212/1052* (2013.01); *G06F 2221/033* (2013.01)

(56) References Cited

U.S. PATENT DOCUMENTS

| | | |
|---|---|---|
| 8,510,596 B1 | 8/2013 | Gupta et al. |
| 8,966,312 B1 | 2/2015 | Gupta et al. |
| 9,727,729 B2 | 8/2017 | Gupta |
| 10,079,841 B2 | 9/2018 | Gupta et al. |
| 2009/0249289 A1 | 10/2009 | Akritidis et al. |
| 2009/0282393 A1 | 11/2009 | Costa et al. |
| 2010/0050266 A1* | 2/2010 | Cheng .................. G06F 9/3004 726/26 |
| 2011/0258516 A1* | 10/2011 | Salmon-Legagneur ..................... G06F 21/54 714/768 |
| 2014/0020112 A1 | 1/2014 | Goodes |
| 2016/0026791 A1* | 1/2016 | Melski .................... G06F 21/54 726/25 |
| 2017/0286278 A1* | 10/2017 | Thomas .................... G06F 8/70 |
| 2018/0046585 A1* | 2/2018 | Okhravi ................ G06F 16/245 |
| 2019/0138725 A1* | 5/2019 | Gupta ..................... G06F 21/54 |
| 2013/0312058 A1 | 1/2020 | Thompson et al. |
| 2020/0117803 A1* | 4/2020 | Hamlen ................. G06F 3/1222 |
| 2020/0133885 A1 | 4/2020 | Tshouva et al. |

OTHER PUBLICATIONS

Kharbutli et al. "Comprehensively and Efficiently Protecting the Heap", Proceedings of the 12th International Conference on Architectural Support for Programming Languages and Operating Systems, ASPLOS XII, San Jose, CA, USA, Oct. 21-25, 2006, 12 P., Oct. 21, 2018.

Tian et al. "A Practical Online Approach to Protecting Kernel Heap Buffers in Kernel Modules", China Communications, 13(11): 143-152, Nov. 2016.

Official Action dated Dec. 24, 2020 from the U.S. Patent and Trademark Office Re. U.S. Appl. No. 16/590,403. (52 pages).

\* cited by examiner

DYNAMIC MEMORY PROTECTION

RELATED APPLICATIONS

This application is a National Phase of PCT Patent Application No. PCT/IL2019/051076 having International filing date of Oct. 2, 2019, which claims the benefit of priority under 35 USC § 119(e) of U.S. Provisional Patent Application No. 62/751,774 filed on Oct. 29, 2018. The contents of the above applications are all incorporated by reference as if fully set forth herein in their entirety.

FIELD AND BACKGROUND OF THE INVENTION

The present invention, in some embodiments thereof, relates to applying dynamic memory protection, and, more specifically, but not exclusively, to applying dynamic memory protection in post coding phase.

In the constantly advancing and evolving computerized modern environment, cyber threats have become a major concern. Malicious parties may launch cyber-attacks against multiple platforms, applications and/or services in attempt to gain control over them for a plurality of goals and/or objectives ranging from harmless hacking through exploitation for financial gain all the way to malicious interference in critical systems.

These concerns may be dramatically intensified with the rapid deployment of a huge number of devices, typically small low-end embedded devices used to support automation in a plurality of fields, areas and markets, for example, autonomous vehicles, smart cities, agriculture, medical care and medical procedures and/or the like. Such low-end embedded devices may typically have limited resources which may be insufficient for applying sophisticated mitigation measures to counter such cyber threats.

However, these limited resources embedded devices may be involved in critical applications, services and/or the like and may optionally serve as access points to higher level platforms and systems. Embedded devices may therefore present a major security breach which may be exploited by malicious parties.

SUMMARY OF THE INVENTION

According to a first aspect of the present invention there is provided a computer implemented method of generating code files adjusted to apply dynamic memory protection, comprising:
  Receiving one or more code files comprising a plurality of routines, the code file(s) was created for execution by one or more processors using a dynamic memory region supporting run-time dynamic allocation of memory blocks;
  Adjusting the code file(s) by:
    Analyzing the code file(s) to identify one or more exploitation vulnerable routines of the plurality of routines.
    Adding a memory integrity code segment configured to detect, upon execution completion of each vulnerable routine, a write operation exceeding from a memory space of one or more of a subset of most recently allocated blocks of a plurality of blocks allocated in the dynamic memory region to a memory space of an adjacent one of the plurality of blocks using one or more of a plurality of markers inserted in the dynamic memory region in one or more boundaries of each of the blocks of the subset.
  Outputting the adjusted code file(s).
Wherein, in runtime, in case the write operation is detected, the memory integrity code segment causes the processor(s) to initiate one or more predefined actions.

According to a second aspect of the present invention there is provided a system for generating code files adjusted to apply dynamic memory protection, comprising a program store storing a code and one or more processor coupled to the program store for executing the stored code, the code comprising:
  Code instructions to receive one or more code file comprising a plurality of routines. The code file(s) is created for execution by one or more processor using a dynamic memory region supporting run-time dynamic allocation of memory blocks.
  Code instructions to adjust one or more code file(s) by:
    Analyzing the one or more code file to identify one or more exploitation vulnerable routines of the plurality of routines.
    Adding a memory integrity code segment configured to detect, upon execution completion of each vulnerable routine, a write operation exceeding from a memory space of one or more of a subset of most recently allocated blocks of a plurality of blocks allocated in the dynamic memory region to a memory space of an adjacent one of the plurality of blocks using one or more of a plurality of markers inserted in the dynamic memory region in one or more boundaries of each of the blocks of the subset.
  Code instructions to output the one or more adjusted code file.
Wherein, in runtime, in case the write operation is detected, the memory integrity code segment causes the one or more processor to initiate one or more predefined action.

According to a third aspect of the present invention there is provided a computer program executable file generated from one or more code file adjusted to support dynamic memory protection, comprising a non-transitory computer readable storage medium and a plurality of program instructions each of a respective one of a plurality of routines of an executable file generated, for execution by one or more processor using a dynamic memory region, supporting run-time dynamic allocation of memory blocks, from one or more code file adjusted to support dynamic memory protection by adding a memory integrity code segment. The memory integrity code segment is configured to detect, upon execution completion of one or more exploitation vulnerable routines of the plurality of routines, a write operation exceeding from a memory space of one or more of a subset of most recently allocated blocks of a plurality of blocks allocated in the dynamic memory region to a memory space of an adjacent one of the plurality of blocks using one or more of a plurality of markers inserted in the dynamic memory region in one or more boundaries of each of the blocks of the subset. Wherein the plurality of program instructions are executed by the processor(s) from the non-transitory computer readable storage medium.

In a further implementation form of the first, second and/or third aspects, one or more of the code file(s) is a source code file adjusted prior to compilation by a compiler adapted to create one or more respective intermediate code files used for the generation of one or more respective executable code files for execution by the one or more processor.

In a further implementation form of the first, second and/or third aspects, one or more of the code file(s) is an intermediate code file generated by a compiler prior to the generation of one or more respective executable code file for execution by the one or more processor, the one or more intermediate code file is a member of a group consisting of: an object file and an archive file.

In a further implementation form of the first, second and/or third aspects, one or more of the code file(s) is an executable code file comprising machine code generated for execution by the one or more processor.

In a further implementation form of the first, second and/or third aspects, each of the plurality of routines is a member of a group consisting of: a routine, a sub-routine and/or a function.

In a further implementation form of the first, second and/or third aspects, one or more of the vulnerable routines are manually defined by one or more expert, the expert is a member of a group consisting of: a developer, an operator and/or a user.

In a further implementation form of the first, second and/or third aspects, one or more of the vulnerable routines are automatically defined based on the analysis of the one or more code file.

In a further implementation form of the first, second and/or third aspects, the write operation is detected by checking a data overrun in a memory location in which the one or more marker is inserted.

In a further implementation form of the first, second and/or third aspects, in case one or more of the code file(s) are intermediate code files, the memory integrity code segment is added by adding a trampoline branch function which is invoked instead of each vulnerable routine and configured to first invoke the one or more vulnerable routine followed by invocation of the memory integrity code segment after the one or more vulnerable routine completes execution.

In a further implementation form of the first, second and/or third aspects, in case one or more of the code file(s) are intermediate code files, the memory integrity code segment is added by adding a branch instruction at the end of each vulnerable routine to invoke the memory integrity code segment immediately after the respective vulnerable routine completes execution.

In a further implementation form of the first, second and/or third aspects, in case one or more of the code file(s) are executable code files, the memory integrity code segment is added by creating one or more dynamically preloaded library configured to include a replacement routine for each vulnerable routine. The replacement routine is configured to first invoke the respective vulnerable routine followed by invocation of the memory integrity code segment after the respective vulnerable routine completes execution.

In a further implementation form of the first, second and/or third aspects, the memory integrity code segment is added to one or more memory management routines inherent to an operating system executed by one or more of the processors.

In an optional implementation form of the first, second and/or third aspects, the memory integrity code segment is further configured to invoke prior to invocation of one or more of the vulnerable routine(s) to detect a potential imminent write operation to be performed by the at least one vulnerable routine which exceeds from the memory space of one of the most subset of recently allocated blocks. The memory integrity code segment detects the exceeding write operation by analyzing an address range transferred to the at least one vulnerable routine for processing to determine whether the transferred address range crosses one or more of the boundaries.

In a further implementation form of the first, second and/or third aspects, the subset of recently allocated blocks includes all blocks allocated in the dynamic memory region.

In a further implementation form of the first, second and/or third aspects, context switches and interrupts are disabled upon invocation of the memory integrity code segment.

In a further implementation form of the first, second and/or third aspects, the memory integrity code segment identifies members of the subset of most recently allocated blocks by traversing one or more recent allocation lists. Each of the most recently allocated blocks is associated in one or more of the recent allocation list(s) with a pointer to the respective most recently allocated block, a respective one of the plurality of markers and a size of the respective most recently allocated block. Wherein a maximum number of most recently allocated blocks listed in the recent allocation list(s) is predefined.

In a further implementation form of the first, second and/or third aspects, the memory integrity code segment detects the write operation by detecting that the value of the one or more markers inserted in the dynamic memory region in one or more of the boundaries of the most recently allocated block does not match the value of the one or more marker associated with the most recently allocated block in one or more of the recent allocation list(s).

In a further implementation form of the first, second and/or third aspects, each of the recent allocation list(s) is maintained by one or more adjusted memory management routine of the plurality of routines configured to conduct one or more memory allocation operation which is a member of a group consisting of: allocating a block in the dynamic memory region and/or releasing (freeing) a block in the dynamic memory region. Each of the adjusted memory management routine(s) is adjusted to invoke an allocation tracking code segment added to one or more of the code file(s). The allocation tracking code segment is configured to:

Add a newly allocated block to the at least one recent allocation list upon allocation of the newly allocated block by:
Updating one or more of the recent allocation list(s) to add an entry for the newly allocated block, the added entry associates the newly allocated block with a respective unique marker, a pointer to the newly allocated block and a size of the newly allocated block.
Insert the respective unique marker in the dynamic memory region in the one or more boundaries of the allocated block.

Remove an allocated block from the recent allocation list(s) by:
Validating the removed allocated block by determining whether an exceeding write operation to the memory space of the removed allocated block by comparing between the unique marker inserted in one or more of the boundaries of the removed allocated block and the unique marker of the removed allocated block in the recent allocation list(s).
Removing the entry mapping the removed allocated block from the recent allocation list(s).

In a further implementation form of the first, second and/or third aspects, the allocation tracking code segment is further configured to insert the size of the newly allocated block in one or more boundary of the newly allocated block to serve as another one of the plurality of markers.

In a further implementation form of the first, second and/or third aspects, the respective unique marker is randomly selected for the allocated block upon the allocation.

In a further implementation form of the first, second and/or third aspects, in case an allocation of another newly allocated block is required while the recent allocation list(s) is full, the allocation tracking code segment removes a least recently allocated block from the at least one recent allocation list(s) by:

Validating the least recently allocated block.
Removing the entry mapping the least recently allocated block from the recent allocation list(s).

In a further implementation form of the first, second and/or third aspects, the allocation tracking code segment is further configured to:

Replace the respective unique marker located in one or more boundaries of the least recently allocated block with a global marker. The global marker is randomly selected during every startup event of one or more of the processor(s), during initiation of one or more processes executed by the processor(s) and/or the like.
Insert a size of the least recently allocated block in a top boundary of the least recently allocated block.

In a further implementation form of the first, second and/or third aspects, the allocation tracking code segment is further configured to validate each released allocated block which is not listed in the recent allocation list(s) by determining whether an exceeding write operation occurred to a memory space of the released allocated block based on verification of the global marker inserted in one or more of the boundaries of the released allocated block, the allocation tracking code segment retrieves the global marker using the size of the released allocated block inserted in the top boundary of the released allocated block.

In a further implementation form of the first, second and/or third aspects, the global marker is randomly selected during every startup event of the one or more processor.

In a further implementation form of the first, second and/or third aspects, in case one or more of the code file(s) are intermediate code files, the allocation tracking code segment is added by adding a trampoline branch function which is invoked instead of the one or more memory management routine and configured to invoke the allocation tracking code segment prior and following execution of the one or more memory management routine.

In a further implementation form of the first, second and/or third aspects, in case one or more of the code file(s) are intermediate code files, the allocation tracking code segment is added by adding a branch instruction at the beginning and at the end of the one or more memory management routine to invoke the allocation tracking code segment at the start of and at the end of execution of the one or more memory management routine.

In a further implementation form of the first, second and/or third aspects, in case one or more of the code file(s) are executable code files, the allocation tracking code segment is added by creating one or more dynamically preloaded library configured to include a replacement routine for the one or more memory management routine. The replacement routine is configured to invoke the allocation tracking code segment prior and following execution of the one or more memory management routine.

In a further implementation form of the first, second and/or third aspects, the memory integrity code segment is further configured to detect, upon execution completion of the one or more vulnerable routine, the write operation exceeding from a memory space of one or more of a subset of exploitation susceptible blocks of the plurality of blocks to a memory space of an adjacent one of the plurality of blocks using one or more of the plurality of markers. Each of the subset of exploitation susceptible blocks was previously allocated in the dynamic memory for use by the one or more vulnerable routine.

In a further implementation form of the first, second and/or third aspects, the subset of exploitation susceptible blocks is listed in a susceptible blocks list. Each of the exploitation susceptible blocks is associated in the susceptible blocks list with a pointer to the respective exploitation susceptible block, a respective one of the plurality of markers and a size of the respective exploitation susceptible block. Wherein a maximum number of exploitation susceptible blocks listed in the susceptible blocks list is predefined.

In an optional implementation form of the first, second and/or third aspects, one or more of the code file(s) are adjusted to invoke execution of the memory integrity code segment prior to invocation of one or more critical routine.

In a further implementation form of the first, second and/or third aspects, the predefined action is a member of a group consisting of: crashing execution of the one or more processor, halting execution of the one or more processor, causing the one or more processor to branch to a predefined address, preventing the one or more processor from executing one or more potentially malicious code instruction and/or generating an indication of a dynamic memory overrun.

In an optional implementation form of the first, second and/or third aspects, in case one or more of the code file(s) are intermediate code files, one or more of the intermediate code file(s) are adjusted to amend instruction(s) and/or data element(s) affected by the addition of the added code segments.

In an optional implementation form of the first, second and/or third aspects, in case one or more of the code file(s) are intermediate code files, one or more of the intermediate code file(s) are amended to update its symbol table to reflect inclusion of the added code segments and an increase to size of the adjusted routines.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
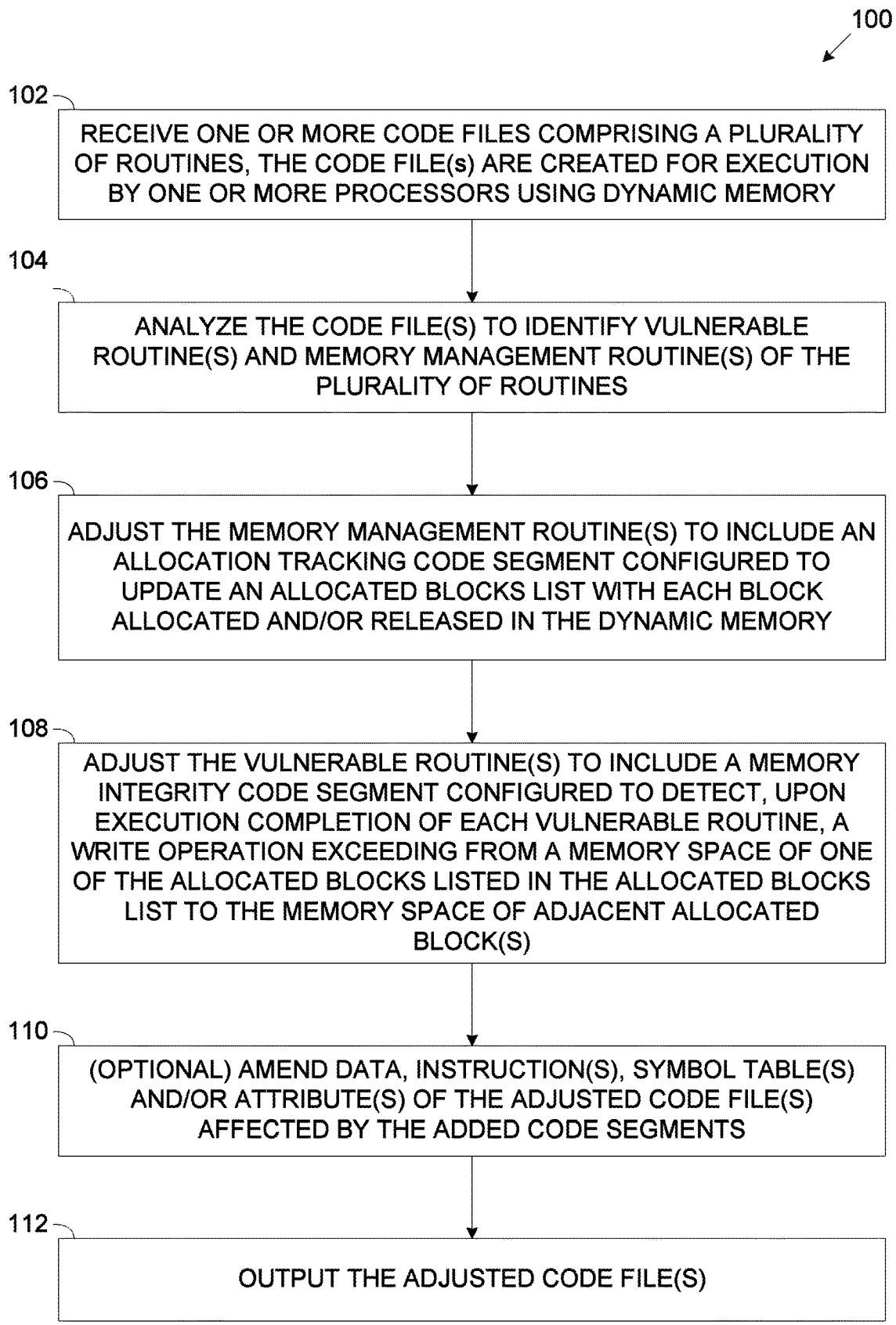
FIG. 1 is a flowchart of an exemplary process of adjusting code files to apply dynamic memory protection, according to some embodiments of the present invention.

The present invention, in some embodiments thereof, relates to applying dynamic memory protection, and, more specifically, but not exclusively, to applying dynamic memory protection in post coding phase.

According to some embodiments of the present invention, there are provided methods, systems and computer program products for adjusting one or more code files to include additional code (logic) configured to apply memory protection to protect memory used by one or more processors for their execution. In particular, the memory protection is directed to dynamic memory, for example, heap, data segment and/or the like supporting dynamic allocation and release of memory blocks in run-time.

The code file(s) may include, for example, source code file(s), intermediate code file and/or executable code file(s) each comprising a plurality of routines, sub-routines, functions and/or the like collectively designated routine herein.

The code files adjusted to include the dynamic memory protection code (logic) are post coded (in post coding phase) meaning the programmer(s) (developer(s)) of the code files have completed coding such that the code files are ready for generating respective executable code. The source code file(s) may be adjusted prior to compilation by one or more compilers adapted to create one or more respective intermediate code files, for example, an object file, a library file, an archive file and/or the like used for the generation of one or more respective executable files. The intermediate code file(s) generated from the source code file(s) by the compiler(s) may be adjusted prior to the generation, build and/or link of the respective executable file(s). In case of the executable code file(s) comprising machine code, the added dynamic memory protection code may be added by creating one or more dynamically preloaded libraries comprising the dynamic memory protection code. The executable file(s) may be executed by one or more processors of one or more devices, systems and/or platforms collectively designated device herein after.

Malware (malicious code), for example, a computer virus, a worm, a Trojan horse, a ransomware, a spyware, an adware, a scareware and/or the like may be used by a potentially malicious party(s) to gain control over the processor(s)' control (execution) flow. The malware may apply one or more security exploits, for example, buffer overflow, buffer overrun and/or the like to manipulate one or more dynamic memory regions, for example, the heap memory, the data segment and/or the like (typically implemented in volatile memory resource) used by the processor(s) for its execution. The malware may manipulate the dynamic memory of the processor(s) in attempt to gain control over the processor(s) by causing a buffer overflow and/or overrun to invoke malicious code in areas known to hold executable code or to selectively overwrite data pertaining to the program's state, therefore causing behavior that was not intended by the original programmer (developer).

During runtime, memory blocks may be allocated in the dynamic memory for use by one or more routines, processes and/or tasks executed by the processor(s) which require memory resources. The malware(s) may compromise and/or exploit one or more of the routines to overrun (overflow) the dynamic memory by writing to a memory space in the dynamic memory which exceeds from the memory space of one or more allocated block allocated in the dynamic memory for use by the exploited routine. The overrun event may be expressed by write operations exceed from the memory space of a certain allocated block to the memory space of an adjacent block in the dynamic memory, for example, a preceding block and/or a succeeding block which may be a block allocated for use by one or more of the routines, the stack used by the processor(s) executing the executable file(s) generated using the adjusted code file(s), a data structure and/or the like. The routine(s) compromised and/or exploited by the malware may typically include memory manipulation routine(s), for example, a memory copy routine, a memory move routine, a string copy routine and/or the like. Since these routines are directed to manipulating the dynamic memory, they may be targeted for exploitation by the malware and may therefore be regarded as vulnerable routine(s).

In order to apply the dynamic memory protection in the code file(s), one or more of the routines in the code file(s) may be adjusted to include dynamic protection logic (code) adapted to identify overrun(s) in the dynamic and prevent the malware from taking control over the processor(s)' control flow by manipulating the dynamic memory to invoke the malicious code. The dynamic protection is based on inserting markers at memory locations at the boundaries of the memory space of the allocated blocks and validating the values of the markers after execution completion of the vulnerable routine(s).

Each of the code file(s) may be analyzed to identify the plurality of routines, in particular the vulnerable routine(s). The code file(s) may be further analyzed to identify one or more memory management routines, in particular, memory allocation routines, for example, a memory block allocation routine, a memory block free (release) routine and/or the like which may be initiated (called) by one or more of the routines, processes and/or tasks requesting dynamic memory resources. For example, in case of the source code file(s), the vulnerable routine(s) and/or the more memory management routine(s) may be predefined using their mnemonics and/or syntax. In another example, in case of the intermediate code file(s) and/or the executable code file(s), code files may be analyzed using one or more methods, tools and/or techniques as known in the art to identify the vulnerable routine(s) and/or the memory management routine(s).

The code file(s) may be adjusted to include and/or append allocation tracking code which may be invoked upon execution of one or more of the memory management routines. The allocation tracking code may be configured to maintain one or more allocated blocks lists comprising a plurality of entries each associating a respective one of the allocated blocks in the dynamic memory with a unique marker. Each entry may include a pointer to the respective allocated block, a size of the respective allocated block and the unique marker of the respective allocated block. The allocation tracking code may be further configured to insert the unique marker associated with a respective allocated block in the memory location at one or both boundaries of the respective allocated block.

During runtime execution of the processor(s) executing the executable file(s) generated using the adjusted code file(s), upon allocation of a newly allocated block, the allocation tracking code may update the allocated blocks list(s) to include a new entry mapping the newly allocated block. The allocation tracking code may further insert the respective unique marker in the memory location(s) at the boundary(s) of the newly allocated block.

The code file(s) may be further adjusted to include memory integrity code which may be invoked after completion of execution of each of the vulnerable routines to validate the integrity of the allocated blocks listed in the allocated blocks list by verifying that the executed vulnerable routine(s) did not overrun the allocated blocks.

During runtime, the memory integrity code executed after execution completion of the vulnerable routine, may compare the value of the memory location at the boundary(s) of each of the listed allocated blocks in which the unique marker was inserted with the value of the respective unique marker associated with the respective listed allocated block in the allocated blocks list(s). In case of no match for one or more of the allocated blocks, the memory integrity code may determine that an overrun occurred since the write operations exceeded from the memory space of a certain allocated block(s) and hence altered (overrun) the data value at the unique marker memory location. In case of a match for all the allocated blocks, the memory integrity code may determine no overrun occurred.

Optionally, the memory integrity code segment is configured to invoke and execute before invocation of one or more of the vulnerable routines to detect a potential imminent write operation to be performed by the respective vulnerable routine(s) which exceeds from the memory space of one or more of the subset of most recently allocated blocks. The memory integrity code segment may detect the exceeding write operation by analyzing an address range transferred to the respective vulnerable routine for processing. Based on the analysis, the memory integrity code may determine whether the transferred address range crosses the one or more of the boundaries of one or more of the block listed in the allocated blocks list(s).

Optionally, the memory integrity code segment may be invoked premeditatedly independently of execution of the vulnerable routine(s) by one or more routines which may trigger the memory integrity code segment to traverse the allocated blocks list(s) and verify that no overrun occurred in any of the allocated blocks listed in the allocated blocks list(s).

The dynamic memory may be significantly large and therefore an extremely large number of blocks may be allocated in the dynamic memory at any given time during the runtime execution of the processor(s). Tracking such a large number of allocated blocks may require significant computing resources, for example, storage resources, processing power, processing time and/or the like. This may present a major limitation, in particular for low-end devices and/or systems having limited such resources, for example, embedded devices, IoT devices, medical devices and/or the like.

In order to overcome this limitation for supporting the low-end devices and/or for reducing the computing resources, the allocation tracking code may be configured to track allocation of only a subset of the blocks allocated in the dynamic memory. In particular, the subset may comprise recently allocated blocks which are the most recently block allocated in the dynamic memory. Based on observations, analysis and simulation of a plurality of exploitation events it was determined that in the crucial majority of dynamic memory exploitation scenarios the malware exploits recently allocated dynamic memory blocks. The most recently allocated dynamic memory blocks are most susceptible to exploitation by the malware because allocation of memory resources such as the blocks in the dynamic memory is done in response to allocation requests received from the routines, processes and/or tasks requiring the memory resources for immediate use. It is less likely that the routines, processes and/or tasks will issue memory allocation request(s) "long" (in terms of execution time) before actually using the allocated memory resources. The malware compromising one or more of the vulnerable routines may therefore access dynamic memory block(s) allocated for compromised vulnerable routine(s) which are typically the most recently allocated memory blocks.

The allocation tracking code added to the code file(s) may be therefore configured to maintain, in runtime, a significantly reduced subset of recently allocated blocks and hence a significantly reduced number of entries in one or more recent allocation lists comprising a predefined number of entries each listing a respective one of the most recently allocated blocks. The maximum number of tracked recently allocated blocks may be predefined according to one or more operational parameters and/or attributes of the processor(s) executing the executable file(s), for example, a size of the dynamic memory, a maximum/minimum size of an allocated block, the computing resource(s) available to the processor(s), a feature of an operating system, a nature of the device and/or application (i.e. real-time, life critical, etc.) and/or the like. For example, for a low-end device, the number of most recently allocated blocks listed in the allocated blocks list(s) may be relatively limited. However, for high-end devices having massive computing resources, the number of most recently allocated blocks listed in the allocated blocks list(s) may be significantly large and may optionally include all blocks allocated in the dynamic memory.

While typically the malware may exploit memory blocks which were recently allocated in the dynamic memory, in some scenarios the malware may attempt to use memory block allocated in the dynamic memory in advance meaning that the in-advance allocated blocks are not the most recently allocated blocks. Since the in-advance allocated blocks are not necessarily the most recently allocated blocks, these in-advance allocated blocks may not be listed in the recent allocation list(s). Moreover, since the malware may attempt to compromise the vulnerable routine(s), the malware may typically attempt to exploit allocated blocks which were allocated in advance for use by one or more of the vulnerable routines. Such in-advance allocated blocks may therefore be highly susceptible to exploitation by the malware(s).

To overcome such scenarios, the allocation tracking code added to the code file(s) may be configured to maintain, in runtime, an additional list designated susceptible blocks list which comprises a predefined number of entries each listing a respective one of the susceptible allocated blocks.

Complementary, the memory integrity code may be configured to validate, in runtime, the integrity of only the allocated blocks listed in the recent allocation list(s) and optionally the allocated blocks listed in the susceptible blocks list. As described herein before, the memory integrity code may compare the value of the memory location at the boundary(s) of each of the listed allocated blocks in which the unique marker was inserted with the value of the respective unique marker associated with the respective listed allocated block in the recent allocation list(s) and optionally in the susceptible blocks list. In case of no match for one or more of the listed allocated blocks, the memory integrity code may determine that an overrun occurred and in case of a match for all the listed allocated blocks, the memory integrity code may determine no overrun occurred and the listed allocated blocks are valid.

Optionally, the code file(s) are adjusted to include invocation of the memory integrity code prior to execution of one or more critical routines identified in the code file(s). The critical routine(s) which may be manually defined and/or automatically identified based on the analysis of the code file(s). The critical routine(s), when executed, may compromise an intended behavior of the device in a way that may lead to potentially hazardous, dangerous and/or harmful consequences and/or results, in particular, compromised intended behavior relating to interaction with one or more other parties, for example, people (e.g. user, patient, operator, etc.), devices, systems and/or the like such that the compromised intended behavior may affect, impact and/or harm the other party(s).

Applying the dynamic memory protection by adjusting the code file(s) in using the added code segments may present significant advantages and benefits compared to existing methods and systems for incorporating dynamic memory protection measures into the code.

First, the dynamic protection described herein allows for real-time detection of the overrun which may be indicative of malicious actions by validating the allocated blocks immediately following execution of the vulnerable routine(s). This may allow fast and possibly immediate response to prevent the malware from diverting the processor(s) from their execution flow and thus prevent undesired operations, consequences and/or implications which may result in damage and/or harm. This may present a major advantage over the existing methods, for example, HeapSentry which may be incapable of detecting the heap memory overrun in real-time and may therefore be able to detect the overrun only after the malware has initiated malicious code and harm is done. Moreover, existing methods such as, for example, the HeapSentry may be limited to detecting memory overruns only in the heap memory while the dynamic protection described herein may be applied for additional dynamic memory regions beyond the heap memory, for example, the data segment and/or the like.

Moreover, some of the existing methods, for example, HeapSentry may be directed to apply the heap protection functionality for all blocks allocated in the heap memory. This may require significant computing resources for example, processing power, processing time, storage resources and/or the like. This may present a major limitation for applying the dynamic memory protection, in particular for the low-end and/or limited resources devices. In contrast, applying the recently allocated methodology for validating only a significantly small and limited number of recently allocated blocks may significantly reduce the computing resources required by the processor(s) for applying the dynamic memory protection. This may make the dynamic memory protection highly suitable for the low-end and/or limited resources devices. Moreover, expanding the dynamic memory protection for the susceptible allocated blocks may further increase protection against exploitation of the dynamic memory while maintaining the number of allocated blocks that need to be validated to a significantly small number thus maintaining low computing resources utilization.

In addition, the dynamic memory protection measures, i.e. the added code segments comprise very simple logic and a limited low number of instructions thus requiring very limited and typically insignificant processing and/or storage resources for their execution and/or storage. As such the applied dynamic memory protection measures may be highly suitable for the low-end and/or typically limited resources devices.

Some of the existing methods may require and/or rely on specific platform, hardware and/or software capabilities and functionality for applying dynamic memory protection, in particular heap memory protection, for example, heap isolation, tasks invocation, kernel-user separation and/or the like. In contrast, applying the dynamic memory protection using the added dynamic protection code segments is independent of such requirements and/or prerequisite and is therefore oblivious and agnostic of the operating system, hardware features, architecture specifics and/or the like. As such, the dynamic memory protection may be applied to practically any platform, architecture, execution environment, operating system and/or the like.

Moreover, some of the existing methods such as, for example, Address Space Layout Randomization (ASLR) and HeapSentry may require operating system resources for protecting the heap memory, for example, dynamically loadable code modules, system calls and/or the like. Moreover, some of the operating system resources required by the existing methods may further require hardware support resources, for example, a Memory Management Unit (MMU) and/or the like. Such operating system resources and/or hardware support resources may not be available in a plurality of computing devices, systems, platforms and/or execution environments in particular in low-end and/or limited resources devices, for example, embedded devices, IoT devices, medical devices and/or the like. In contrast, applying the dynamic memory protection through adjustment of the routine(s) to include the added dynamic protection code segments may allow applying the mitigation measures to practically any type of code file whether source and/or intermediate code file used to generate executable files ranging from simple single binary file firmware to complex operating systems.

Finally, the dynamic memory protection may be applied in the code file(s), in particular in the intermediate code files and/or in the executable code files in post coding phase, i.e. after finalized for generating executable code file(s) compared to the existing methods which may be able to apply such protection only in source code files, in particular while developed (coded). Therefore, in contrast to most of the existing methods, the dynamic memory protection described herein may be applied to intermediate code files for which the source code is not available, for example, $3^{rd}$ party intermediate code files, library files, and/or the like.

In addition, applying the dynamic memory protection measures in the post coding phase may require no change, modification, alteration and/or adaptation to the development environment as may be required by the existing methods. Since development environments comprising one or more tools, for example, toolchain, compiler, linker, builder and/or the like may be significantly complicated, adjusting them as may be done by the existing methods may require significant resources and/or time thus rendering the existing methods costly, inefficient and/or limited. In contrast, dynamic memory protection measures applied in the post coding phase may be easily integrated into existing development environment(s) and software package builds with no impact to the developer's environment. For example, the tool(s) and/or procedures required for generating and adding the added code segments may be invoked by adding one or more entries (lines) in one or more build and/or link configuration files, for example, a makefile and/or the like. Moreover, since the dynamic memory protection measures are applied in the post coding phase hence inflict no impact to the developer's toolchain, the developer does not need to be trained to use a modified toolchain as may be required in the existing methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of adjusting code files to apply dynamic memory protection, according to some embodiments of the present invention. An exemplary process 100 may be executed for adjusting one or more code files to include code configured to apply dynamic memory protection for memory used by one or more processors for their execution. Specifically, the included code is configured to protect dynamic memory, for example, heap memory, data segment and/or the like supporting dynamic allocation and release of memory blocks in run-time.

The code file(s) may include, for example, source code file(s), intermediate code file and/or executable code file(s) each comprising a plurality of routines, sub-routines, functions and/or the like collectively designated routine herein after. The code files adjusted to include the dynamic memory protection code (logic) are in post coded phase meaning that the programmer(s) has completed coding them such that the code files are ready for generating respective executable code file(s) for execution by one or more processors of one or more devices. For execution of the executable file(s), the processor(s) uses one or more dynamic memory regions (system memory), for example, the heap memory, the data segment and/or the like which support dynamic allocation and release of memory blocks in run-time during the execution of the executable file(s).

The code file(s) may include one or more source code files adjusted before compilation by one or more compilers adapted to create one or more respective intermediate code files, for example, an object file, a library file, an archive file and/or the like used for the generation of one or more respective executable files. The code file(s) may further include one or more of the intermediate code files generated from the source code file(s) by the compiler(s) and adjusted prior to being used for the generation, built and/or linkage of the respective executable file(s). In case of the executable code file(s), the dynamic memory protection code may be added by creating one or more dynamically preloaded libraries comprising the dynamic memory protection code. The executable file(s) may be executed by one or more processors of one or more devices, systems and/or platforms collectively designated device herein after.

As described herein before, in runtime the malware may apply one or more security exploits, for example, buffer overflow, buffer overrun and/or the like to manipulate the dynamic memory (implemented in a volatile memory resource) of the processor(s) in attempt to gain control over the processor(s). In order to apply dynamic memory protection, one or more of the code file(s) may be adjusted to include dynamic memory protection logic adapted to identify in runtime manipulation of the dynamic memory and prevent the malware from taking control over the processor(s)' control (execution) flow.

Figure 2:
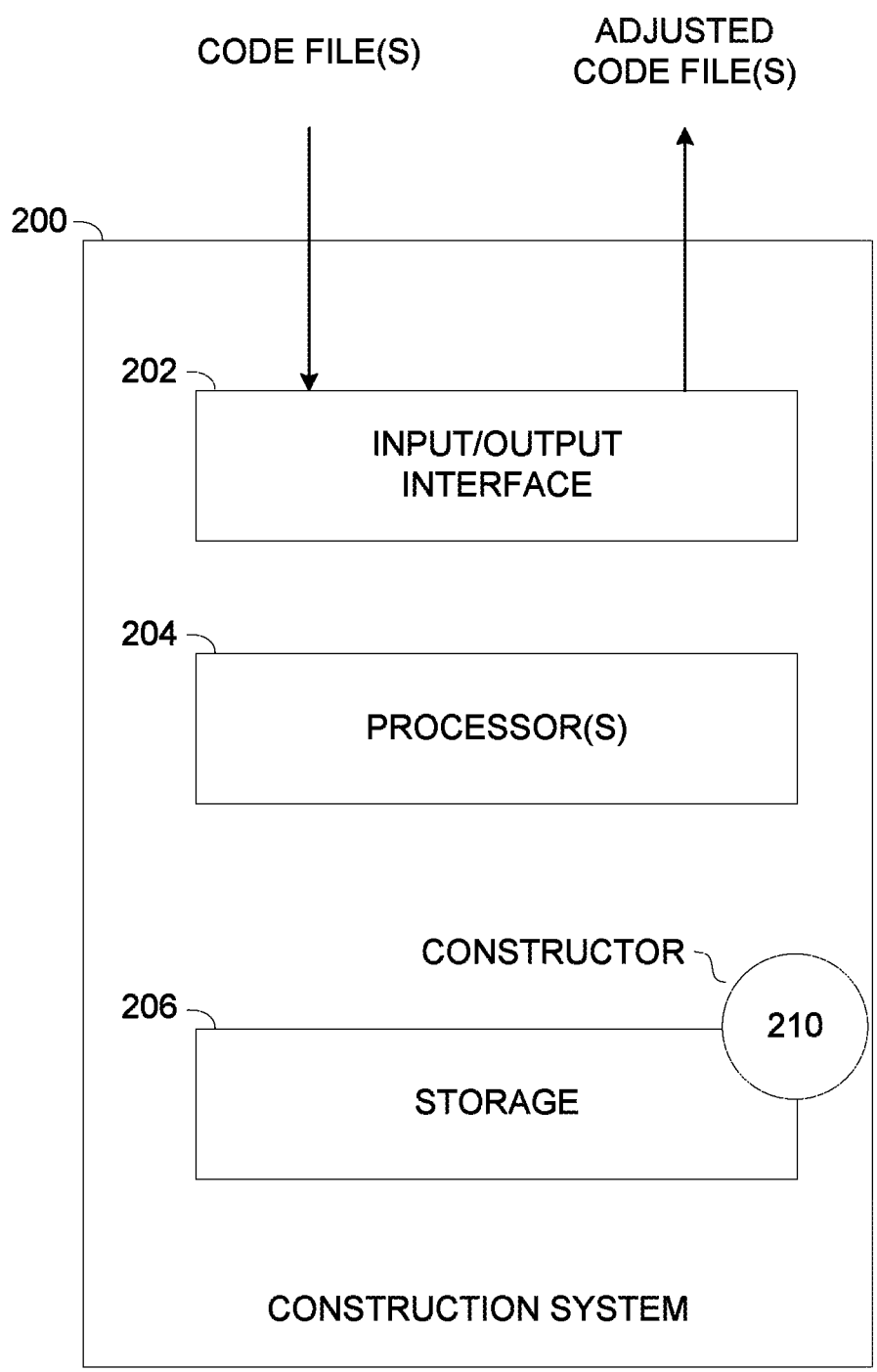
FIG. 2 is a schematic illustration of an exemplary system for adjusting code files to apply dynamic memory protection, according to some embodiments of the present invention.

Reference is also made to FIG. 2, which is a schematic illustration of an exemplary system for adjusting code files to apply dynamic memory protection, according to some embodiments of the present invention. An exemplary construction system 200, for example, a computer, a server, a computing node, a cluster of computing nodes and/or the like may include an Input/Output (I/O) interface 202, a processor(s) 204 for executing a process such as the process 100 and a storage 206 for storing code and/or data.

The I/O interface 202 may include one or more network interfaces for connecting to one or more wired and/or wireless networks, for example, a Local Area Network (LAN), a Wide Area Network (WAN), a Municipal Area Network (MAN), a cellular network, the internet and/or the like. The I/O interface 202 may further include one or more interfaces, for example, a Universal Serial Bus (USB), an attachable storage interface and/or the like for connecting to one or more local resources, for example, an external disk drive, another computing device and/or the like.

The processor(s) 204, homogenous or heterogeneous, may include one or more processing nodes arranged for parallel processing, as clusters and/or as one or more multi core processor(s). The storage 206 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 206 may further comprise one or more local and/or remote network storage resources, for example, a storage server, a Network Attached Storage (NAS), a network drive, and/or the like accessible via one or more networks through the I/O interface 202.

Through the I/O interface 202, the construction system 200 may obtain, for example, receive, fetch and/or retrieve one or more code files created for generation of one or more respective executable files. The construction system 200 may obtain the code file(s) from one or more remote network resources, for example, a server, a processing node, a storage server, a NAS, a cloud service, cloud storage and/or the like. Additionally and/or alternatively, via the I/O interface 202, the construction system 200 may obtain the code file(s) from a locally attached storage resource, for example, an attachable storage media, another computing node and/or the like. The construction system 200 may optionally locally store the obtained code file(s) in the storage 206.

The processor(s) 204 may execute one or more software modules, for example, a process, a script, an application, an agent, a utility, a tool and/or the like each comprising a plurality of program instructions stored in a non-transitory medium such as the storage 206 and executed by one or more processors such as the processor(s) 204. For example, the processor(s) 204 may execute an analysis and construction application (constructor) 210 for adjusting the code file(s) to apply the dynamic memory protection. Optionally, the constructor 210 may be integrated and/or invoked in one or more development environments comprising one or more tools, for example, a toolchain, a compiler, a linker, a builder and/or the like. However, the integrated constructor 210 may not affect and/or impact the development environment tool(s) such that they maintain their original functionality, features and user interface. For example, the constructor 210 may be invoked by adding one or more entries (lines) in one or more build and/or link configuration files, for example, a makefile and/or the like.

Optionally, the construction system 200 and/or the constructor 210 are provided by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

As shown at 102, the process 100 starts with the constructor 210 obtaining one or more code files, for example, a source code file, an intermediate code file and/or an executable code file created for generating one or more respective executable files to be executed by one or more processors of one or more device, systems and/or platforms. The code files are in post coded phase meaning that their programmer(s) (developer(s)) has completed coding them such that the code files are ready for generating respective executable code file(s). The constructor 210 may obtain the code file(s) from one or more sources, for example, the remote network resource(s), the attachable storage device and/or the storage 206.

The code file(s) may include one or more source code files adjusted prior to compilation by one or more compilers adapted to create one or more respective intermediate code files, for example, an object file, a library file, an archive file and/or the like which may be used for the generation of the respective executable file(s).

The code file(s) may further include one or more of the intermediate code files generated from the source code file(s) by the compiler(s) and adjusted prior to the generation of the respective executable file(s). The intermediate code file(s) may be obtained in one or more file formats, for example, Executable and Linkable Format (ELF) and/or the like. The intermediate code file(s) may typically be used for generating, building and/or linking one or more executable files which may be executed by one or more processors.

The code file(s) may also include one or more executable code files comprising machine code are generated, built and/or linked using one or more of the intermediate code files generated form respective source code file(s).

As shown at 104, the constructor 210 may apply one or more code files analysis tools to analyze each of the code file(s) to identify all the routines of the code file(s).

For example, assuming the code file(s) include one or more of the source code files, the constructor 210 may identify one or more of the routines according to the mnemonics and/or syntax of the routines as applicable for the programming language, the processor(s) architecture and/or the execution environment (e.g. operating system) targeted by the executable file(s) to be generated using the adjusted code file(s). in such case the mnemonics and/or syntax of the routines may be predefined for the constructor 210 which may traverse the source code file(s) and identify the predefined routines.

In another example, assuming the code file(s) include one or more of the intermediate code files, the constructor 210 may utilize "pyelftools", which is a python tool (library) for analyzing and parsing ELF files. Using the "pyelftools" tool, the constructor 210 may scan the symbol table of intermediate file(s) in ELF format to identify routines' symbols, and detect the routines' addresses in their respective code sections. The constructor 210 may be adapted to analyze the intermediate code file(s) according to the architecture and instruction set of the processor(s) targeted by the intermediate code file(s) are complied, for example, ARM, ARM-Thumb, x86, x86-64, power ISA and/or the like.

For example, the constructor 210 may identify the routines by iterating over a symbol table of the intermediate code file(s) to identify and map the symbols generated by the compiler(s) for each of the routines in the intermediate code file(s). For example, in the ARM-Thumb architecture each ".o" object (intermediate) file is implemented in the ELF file format. The constructor 210 may identify the routines symbols' names (mnemonics) by iterating over the entries in the "symbol table" section assigned with the extension ".symtab" in the ELF standard. The symbol table comprises information required for locating and relocating program's symbolic definitions and references. Each symbol entry associated with one of the routines in the symbol table is characterized by having a non-zero size field, a type 'FUNC' field and an Index field which references one of the "code" sections in the ".o" object (intermediate) file. One or more of the symbol table entries may further include a bind 'GLOBAL' field and/or a bind 'LOCAL' field.

The constructor 210 may further analyze each of the intermediate code file(s) to identify a beginning address of each of the routines in the intermediate code file. For example, in the ARM-Thumb architecture, in which the start address of Thumb functions is odd and the start address of ARM functions is even, the value of the "Function" (routine) symbol in the symbol table is "beginning of function (routine)+1" to specify that the function contains Thumb code. In such case, and optionally in similar cases for other processor architectures, the constructor 210 may extract the routine "value" from the symbol table of an ".o" object (intermediate) file and perform the opposite mathematical operation to extract the actual beginning address of the routine, i.e. "value−1".

In another example, the analysis tools applied for analyzing the intermediate code file(s) may be applied to analyze the executable code file(s) comprising machine code after converting the machine code to respective intermediate code files comprising respective assembly code, i.e. disassembling the machine code.

Specifically, the constructor 210 analyzes the code file(s) to (automatically) identify one or more vulnerable routines which may be exploited by the malware to gain control over the execution (control) flow of the processor(s). The vulnerable routines may typically be memory manipulation routines, for example, a memory copy routine, a memory move routine, a string copy routine and/or the like which may be used by the malware to overrun the dynamic memory in order to divert the processor(s) from its (normal) execution path and gain control over the processor(s)' execution flow. The type and implementation of the vulnerable routine(s) may be derived and/or dependent on the programming language, the processor(s) architecture and/or the execution environment targeted by the executable file(s) to be generated using the adjusted code file(s). For example, assuming the execution environment includes an operating system coded in the C or C++ coding languages, the vulnerable routines may include, for example, memcpy( ), strcpy( ) and/or the like. Optionally, one or more of the vulnerable routines are manually identified as such by one or more experts, for example, a developer of the execution environment, an operator and/or a user of the device, the system, the platform and/or the like executing the executable file(s) generated using the adjusted code file(s) and/or the like.

Moreover, the constructor 210 analyzes the code file(s) to (automatically) identify one or more memory management routines which may be used to manage the dynamic memory, in particular routines used for dynamic memory allocation. The memory management routines may include, for example, memory block allocation routines, memory block deallocation routines, memory block reallocation routines, memory block release routines, memory block free routines and/or the like. Same as for the vulnerable routines, the type and implementation of the memory management routine(s) may be from the coding language, the processor(s) architecture and/or the execution environment targeted by the executable file(s). For example, assuming the execution environment includes an operating system, the memory management routines may typically be routines, functions, calls, and/or services such as, for example, malloc( ), calloc( ), realloc( ), free( ) etc. which are inherent and available by the operating system. The type and implementation of the memory management routine(s) may further depend on the type, features and/or of the selected operating system. In another example, one or more of the memory management routines may be stand-alone routines, proprietary routines and/or the like which are independent of an operating system and/or not requiring an operating system. Optionally, one or more of the memory management routines are manually identified as such by one or more experts, for example, the developer, the operator, the user and/or the like.

As shown at 106, the constructor 210 may adjust the code file(s) by adjusting one or more of the memory management routines to invoke an allocation tracking code segment. The allocation tracking code segment is configured to track, in runtime, allocation (and release) of memory blocks in the dynamic memory used by the processor(s) executing the executable file(s) generated using the adjusted code file(s). The memory blocks allocated during runtime execution of the executable file(s) are typically allocated in the dynamic memory for use by one or more of the routines. The runtime allocated memory blocks may be exploited by the malware executing malicious code to compromise one or more of the vulnerable routines which use the allocated memory blocks. The malware may apply one or more of the security exploits, for example, the buffer overflow, the buffer overrun and/or the like to manipulate the dynamic memory and gain control over the execution flow of the processor(s).

Runtime tracking of the allocation of the memory blocks in the dynamic memory is therefore applied to facilitate means for supporting dynamic memory protection to prevent exploitation of the dynamic memory by the malware. In particular, the allocation tracking is directed to mark the boundaries of memory blocks allocated in the dynamic memory such that in case of an overrun event in which write operations may exceed from the memory space of one allocated block to the memory space of an adjacent memory block, an alteration (overrun) of the boundary marking may be detected. The adjacent memory block may be a block allocated for use by one or more of the routines, the stack used by the processor(s) executing the executable file(s) generated using the adjusted code file(s), a data structure and/or the like.

As described herein before, the dynamic memory may be significantly large and therefore an extremely large number of blocks may be allocated in the dynamic memory at any given time during the runtime execution of the processor(s). In order to reduce the number of tracked allocated clocks, for example, for low-end devices having limited computing resources, the allocation tracking code segment may be configured to track allocation of only a subset of the blocks allocated in the dynamic memory, in particular the subset comprises a predefined number of most recently blocks allocated in the dynamic memory.

The constructor 210 may therefore configure the allocation tracking code segment to track the most recently blocks allocation using one or more latest allocation lists, for example, a structure, a list, a table and/or the like mapping the predefined number of blocks which were most recently allocated in the dynamic memory. The predefined number of tracked recently allocated blocks may be set according to one or more operational parameters and/or attributes of the processor(s) executing the executable file(s), for example, a size of the dynamic memory, a maximum number of allocated blocks, a maximum size of an allocated block, a minimum size of an allocated block, the computing resource(s) available to the processor(s), a nature of the device and/or application (i.e. real-time, life critical, etc.) and/or the like. For example, for low-end devices having limited computing resources, the number of most recently allocated blocks listed in the allocated blocks list(s) may be relatively limited. In another example, for high-end devices having extensive computing resources, the number of most recently allocated blocks listed in the allocated blocks list(s) may be significantly large and may optionally include all the blocks allocated in the dynamic memory 302.

Figure 3:
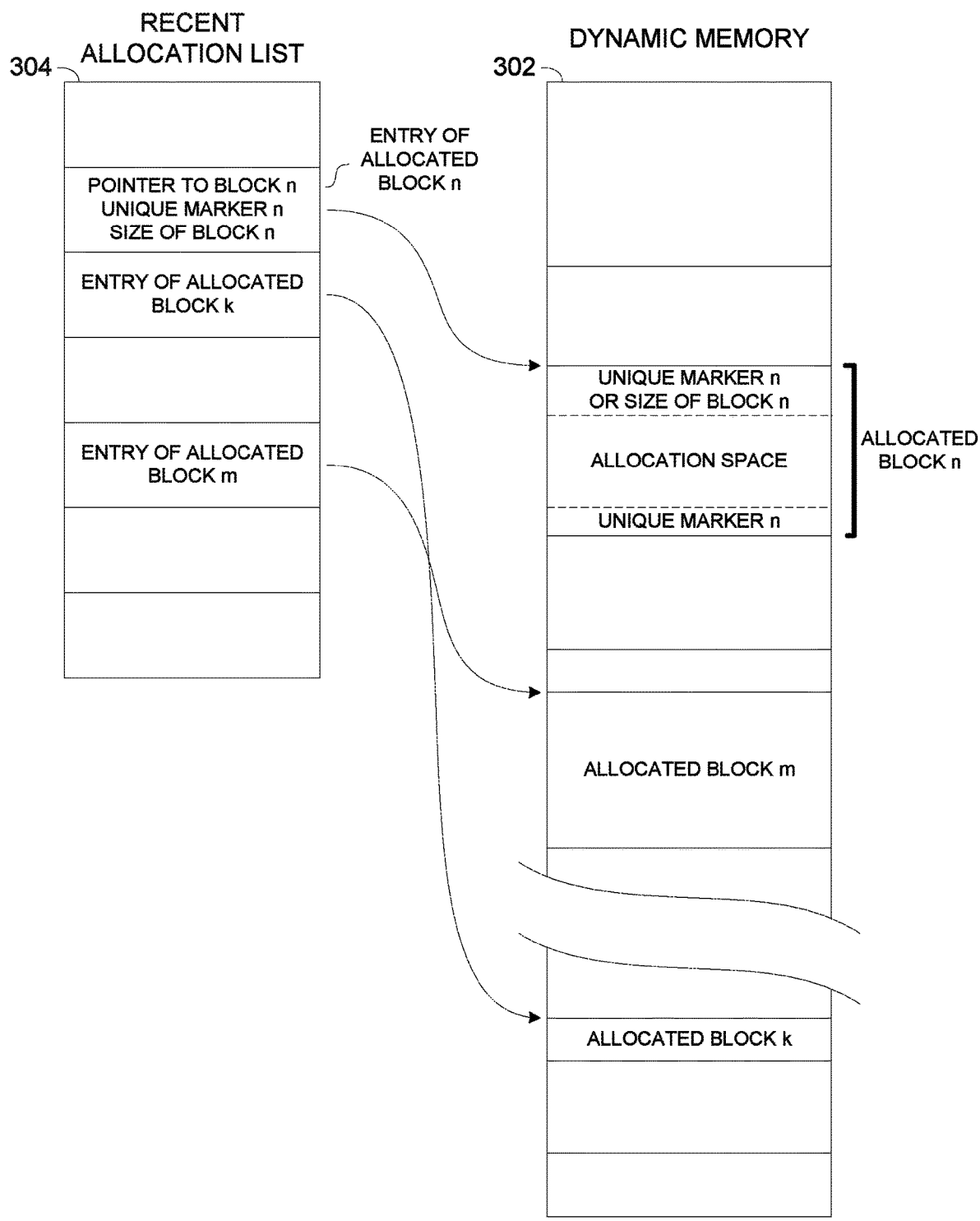
FIG. 3 is a schematic illustration of an exemplary latest allocation list created and used to map allocated dynamic memory blocks for applying dynamic memory protection, according to some embodiments of the present invention.

Reference is now made to FIG. 3, which is a schematic illustration of an exemplary latest allocation list created and used to map allocated dynamic memory blocks for applying dynamic memory protection, according to some embodiments of the present invention. A dynamic memory 302 may be used in runtime by the processor(s) executing the executable file(s) generated using the adjusted code file(s).

A constructor such as the constructor 210 may configure the allocation tracking code segment to track allocation and release of memory blocks allocated in the dynamic memory 302 using one or more recent allocation lists 304. The allocation tracking code segment may be configured to create, maintain and update the recent allocation list(s) 304 upon any allocation event occurring during the runtime execution of the executable file(s) by the processor(s).

The recent allocation list(s) 304 constantly updated in runtime by the allocation tracking code segment may include a plurality of entries mapping the subset of blocks allocated in the dynamic memory 302 specifically the subset comprises the predefined number of the most recently allocated blocks. Each of the entries is associated with a respective one of the subset of most recently allocated blocks and may include a pointer to the respective allocated block, a unique marker generated for the respective allocated block and a size of the allocated block. The recent allocation list(s) 304 may be constructed and/or deployed in one or more implementations and/or modes to best suit the execution environment. For example, a plurality of recent allocation list(s) 304 may be created and maintained in a multi-threading execution environment where each of the threads may execute an independent instance of the allocation tracking code segment which may create and maintain one or more recent allocation lists 304 which are independent of the recent allocation list(s) 304 used by the other thread(s). In another example, multiple recent allocation lists 304 may be constructed in a hierarchical and/or sequential structure based (indexed), for example, on address ranges, for efficient and rapid traversing of the recent allocation lists 304.

The allocation tracking code segment, in particular the allocation tracking code segment inserted in memory allocation routine(s), may be configured to create a new entry in one or more of the recent allocation list(s) 304 upon allocation of another block in the dynamic memory to map the newly allocated block. The allocation tracking code segment may update the new entry associated with the newly allocated block to include the pointer to the newly allocated block, the size of the newly allocated block and the unique marker generated specifically for the newly allocated block. The allocation tracking code segment may apply one or more methods and/or techniques to generate and/or select the unique marker, for example, use a random number generator, randomly select the unique marker from a dataset comprising an extremely large number of random values and/or the like. Optionally, the allocation tracking code segment selects a common marker for all the recently allocated blocks listed in the recent allocation list(s) 304.

Moreover, upon allocation of the newly allocated block, the allocation tracking code segment may insert the unique marker generated for the newly allocated block in one or more boundaries of the newly allocated block, specifically in the bottom boundary of the newly allocated block, i.e. at an end address succeeding the end of the allocated space of the newly allocated block.

Optionally, the allocation tracking code segment inserts the unique marker at the top boundary of the newly allocated block, i.e. at a start address preceding the start of the allocated space of the newly allocated block.

Optionally, the allocation tracking code segment inserts the size of the newly allocated block in one or more boundaries of the newly allocated block, specifically in the top boundary of the newly allocated block, i.e. at a beginning address preceding the start of the allocated space of the newly allocated block. As such the size may serve as a marker located at the top boundary of the newly allocated block. The allocation tracking code segment may further insert an encrypted version of the size into the beginning address.

The constructor 210 may configure the allocation tracking code segment to initiate a request for allocation of a memory space larger than the actual memory space requested by the initiating (calling) routine which initiated the memory manage routine(s). The allocation tracking code segment may thus use the extra memory space for inserting the unique marker at the end of the newly allocated block and optionally the size at the beginning of the newly allocated block. This process conducted by the allocation tracking code segment may be completely transparent to the initiating (calling) routine which will be allocated with the exact amount of memory space it requested.

The allocation tracking code segment, in particular the allocation tracking code segment inserted in the memory release (free) routine(s), may be configured to delete (remove) one or more entries from the recent allocation list(s) 304 which map (associated with) respective released (free) block(s) which are freed and returned to the pool of available memory in the dynamic memory 302. The allocation tracking code segment may remove (delete) the entry(s) from the recent allocation list(s) 304 upon request to release the released block(s).

The allocation tracking code segment, specifically the allocation tracking code segment inserted in the memory allocation routine(s) may be further configured to delete (remove) one or more entries in the recent allocation list(s) 304 and thus remove the associated allocated blocks in case the recent allocation list(s) 304 is full when a request is received to allocate another block in the dynamic memory 302. The allocation tracking code segment may apply one or more methodologies and/or implementation for selecting the allocated block to be removed and which entry is to be deleted, for example, delete an entry mapping a least recently allocated block among the allocated blocks mapped by all entries in the recent allocation list(s) 304. The allocation tracking code segment may be configured to use the deleted entry to map the newly allocated block. After removing the deleted entry and clearing its content, the allocation tracking code segment may update the entry to include a pointer to the newly allocated block, a size of the newly allocated block and a new unique marker generated specifically for the newly allocated block.

The allocation tracking code segment may be further configured to validate memory integrity of an allocated block mapped by the deleted entry and verify that no overrun has occurred to the mapped allocated block. The allocation tracking code segment may be configured to validate the mapped allocated block in case the entry is removed to make room to update the entry for the newly allocated block and/or in case the entry is removed due to release (free) of the respective allocated block.

The allocation tracking code segment may detect the overrun in the allocated block mapped by the deleted entry by detecting one or more write operations exceeding from the memory space of the allocated block(s) mapped by the deleted entry(s) to the memory space of an adjacent block in the dynamic memory 302. The write operation(s) exceeding from the memory space of the allocated block(s) naturally alters (overruns) the unique marker inserted at the end of the allocated block(s) mapped by the deleted entry(s). The allocation tracking code segment may therefore detect the overrun by checking for an alteration of the unique marker by comparing between the unique marker inserted at the top and/or bottom boundaries of the allocated block(s) mapped by the deleted entry(s) and the unique marker included in the respective deleted entry(s). The allocation tracking code segment may use the pointer extracted from the deleted entry to identify the memory location of the marker located at the top boundary of the respective allocated block.

To identify the memory location of the marker located at the bottom boundary of the respective allocated block, the allocation tracking code segment may use the pointer extracted from the deleted entry coupled with the size deleted entry to calculate the memory offset of the memory location at the bottom boundary.

In case of a match between the values of the unique marker, the allocation tracking code segment may determine that no overrun occurred and the allocated block is valid. However, in case of no match the allocation tracking code segment may determine that an overrun event took place potentially by a malware and may initiate one or more predefined actions. The predefined actions may include for example, crashing execution of the processor(s), halting execution of the processor(s), causing the processor(s) to branch to a predefined address, preventing the processor(s) from executing at least one potentially malicious code instruction targeted by a corrupted dynamic memory, generating one or more indications and/or alerts of dynamic memory corruption (dynamic memory overrun) and/or the like. The predefined actions may be selected according to one or more parameters of the execution flow, for example, the processor architecture, a severity and/or criticality of each routine, a user defined parameter and/or the like.

In addition, when removing an allocated block from the recent allocation list(s) 304 and removing (deleting) its entry in order to make room to update the entry for the newly allocated block, the allocation tracking code segment may replace the unique marker inserted at the end address (bottom boundary) of the removed allocated block with a global marker. The global marker is therefore common to all allocated blocks which are still allocated (not released) but are no longer listed in the recent allocation list(s) 304. The allocation tracking code segment may apply one or more methods and/or techniques to generate and/or select the global marker, for example, use a random number generator, randomly select the unique marker from a dataset comprising an extremely large number of random values and/or the like. While common to a plurality of no longer listed allocated blocks, the global marker may be transient and frequently replaced, for example, randomly selected during every startup sequence (boot) of the processor(s) executing the executable file(s), during the first invocation of the allocation tracking code segment, during initiation and/or instantiation of one or more processes by the processor(s) executing the executable file(s) and/or the like.

Optionally, when removing an allocated block from the recent allocation list(s) 304 and removing (deleting) its entry in order to make room for the newly allocated block, the allocation tracking code segment may further insert the size of the removed allocated block at the beginning address (top boundary) of the removed allocated block. This is naturally done in case the size wasn't already inserted to the top boundary when the removed allocated block was initially allocated.

Optionally, the allocation tracking code segment inserted in the memory release (free) routine(s), is configured to validate one or more allocated blocks which are not listed in the recent allocation list(s) 304 upon a request to release such unlisted allocated block(s). The allocation tracking code segment may detect an overrun in each to-be-released unlisted allocated block by verifying a match between a data value retrieved from the location in which the global marker was inserted, i.e. at the boundary, specifically at the end of the to-be-released block(s) and the global marker. In order to retrieve the global marker located at the bottom boundary, the allocation tracking code segment first needs to calculate the end address (bottom boundary) of the to-be-released block. To this end, the allocation tracking code segment may use the pointer received for releasing the to-be-released allocated block to retrieve the size of the to-be-released block located at the top boundary of the to-be released allocated block (pointed by the pointer). The size serving as an offset to the bottom boundary of the to-be released allocated block may then be used by the allocation tracking code segment to retrieve the data from the bottom boundary in which the global marker was inserted. In case of a match the allocation tracking code segment may determine that no overrun occurred and the to-be released allocated block is therefore valid. However, in case of no match the allocation tracking code segment may determine that an overrun event took place and may initiate one or more of the predefined actions.

Reference is made once again to FIG. 1 and FIG. 2.

The constructor 210 may adjust the memory management routine(s) to invoke the allocation tracking code segment at the beginning and/or at the end of the respective adjusted memory management routine such that the allocation tracking code segment may be invoked prior to execution of the normal functionality of the respective memory management routine and/or after completion of execution of the normal functionality. The constructor 210 may adjust the memory management routine(s) to invoke the allocation tracking code segment at the beginning of the adjusted memory management routine and configure the allocation tracking code segment to request increased memory allocation block to have an extra space to insert the unique marker and optionally the size at the allocated block boundaries. The constructor 210 may further adjust the memory management routine(s) to invoke the allocation tracking code segment at the end of the adjusted memory management routine and configure the allocation tracking code segment to insert the unique marker and optionally the size in the extra space at the boundaries of the allocated block boundaries after receiving the pointer to the allocated block and determining its address.

The constructor 210 may add the allocation tracking code segment to the code file(s) using one or more code insertion (hooking) methods, techniques and/or implementations which may be selected according to the type of the code file(s).

For example, in case the adjusted code file is a source code file, the constructor 210 may adjust one or more of the memory management routines to invoke the allocation tracking code segment at the beginning and/or at the end of the adjusted memory management routine(s). Moreover, the constructor 210 may optionally adjust one or more memory management routines which are inherent to the execution environment, e.g. the operating system executed by the target processor(s), for example, malloc( ) calloc( ) free( ) and/or the like. Assuming these inherent memory management routine(s) are available in source code form, the constructor 210 may adjust one or more of these inherent memory management routine(s) to invoke the allocation tracking code segment at its beginning and/or at its end. To apply the change(s) to the adjusted source file to include the allocation tracking code segment in one or more of the memory management routines, the constructor 210 may add one or more source code files, shared libraries, static archives and/or the like to the build of the adjusted source code file.

In another example, in case the adjusted code file is an intermediate code file, the constructor 210 may insert a trampoline branch function configured to invoke the allocation tracking code segment immediately upon invocation (call) of the respective memory management routine. The constructor may 210 may add the trampoline branch function to replace invocation of a respective memory management routine with invocation of the trampoline branch function. The constructor 210 may apply this by replacing the address of the respective memory management routine in the symbol table with the address of the trampoline function. The trampoline branch function may be configured to first invoke the allocation tracking code segment. Upon completion of execution of the allocation tracking code segment, the trampoline branch function may invoke the respective memory management routine. Moreover, the trampoline branch function may invoke the allocation tracking code segment once again after execution completion of the respective memory management routine. In another example applicable for intermediate code files, the constructor 210 may add a branch instruction (e.g. BL) at the beginning and/or at the end of one or more of the adjusted memory management routines to invoke the allocation tracking code segment from within the respective adjusted memory management routine prior and/or following respectively the execution of the respective adjusted memory management routine. To apply the change(s) to the adjusted intermediate file to include the allocation tracking code segment in one or more of the memory management routines, the constructor 210 may add one or more intermediate code files, shared libraries, static archives and/or the like to the build of the adjusted intermediate code file.

In another example, in case the adjusted code file is an executable code file, the constructor 210 may add the allocation tracking code segment(s) by creating one or more dynamically preloaded libraries configured to replace one or more of the memory management routines when the executable code file(s) are loaded by the targeted processor(s). The constructor 210 may apply the dynamically preloaded library(s) for replacing one or more memory management routines which are inherent to the execution environment, e.g. the operating system executed by the target processor(s), for example, malloc( ), calloc( ), free( ) and/or the like. Such inherent memory management routine(s) may typically be provided in one or more dynamically loadable shared libraries which may be mapped by the dynamically preloaded library(s) for replacing the inherent memory management routine(s). Each of the replacement memory management routine(s) may be configured to invoke the allocation tracking code segment prior and/or following execution of the respective inherent memory management routine(s). For example, assuming the code files are part of Linux operating system build, the constructor 210 may create one or more dynamically preloaded libraries provided, for example, in .so file(s) which may be preloaded in runtime using the 'LD_PRELOAD' environmental variable containing one or more paths to the shared libraries dynamically preloaded library(s).

Additionally, the constructor 210 may adjust the executable code file(s) to invoke the allocation tracking code segment(s) for one or more memory management routines created by the programmer (developer) of the code file(s) which are hence not inherent to the execution environment (e.g. the operating system). The programmer may implement one or more of the non-inherent memory management routines in one or more dynamically loadable shared libraries as typically done for the inherent memory management routine(s). In such case, the constructor 210 may add the allocation tracking code segment(s) by creating one or more dynamically preloaded libraries configured to replace one or more of the non-inherent memory management routines when the executable code file(s) is loaded by the targeted processor(s). However, the programmer may also implement one or more of the non-inherent memory management routines not to be loaded through dynamically loadable shared library(s), for example, as part of the main program. In this case, the constructor 210 may add the allocation tracking code segment(s) and configure its invocation by inserting branch instructions into the non-inherent memory management routine(s) at the appropriate location, i.e. the beginning and/or the end of the non-inherent memory management routine(s). To this end, the constructor 210 may first analyze the executable code file(s) and convert the machine code to respective assembly code, i.e. disassemble the machine code. After converted to assembly code, the constructor 210 may adjust the memory management routine(s) for hooking and invoking the allocation tracking code segment(s) as done for the intermediate code files, specifically, add a branch instruction (e.g. BL) at the beginning and/or at the end of one or more of the adjusted non-inherent memory management routines to invoke the allocation tracking code segment from within the respective adjusted non-inherent memory management routine.

Prior to inserting the added code segments to the adjusted code file(s), specifically to the adjusted intermediate code file(s), the constructor 210 may verify there are sufficient available resources, for example, storage space and/or the like for hosting the added code segment(s). However, since the added code segments typically comprise very simple logic, the footprint of the added code segments may be significantly small thus presenting no limitations in integrating them into the adjusted intermediate code file(s).

As described before, in some exploitation scenarios the malware may exploit memory blocks allocated in advance for use by one or more of the vulnerable routines. The in-advance allocated blocks may therefore be highly susceptible to exploitation by the malwares. However, since these in-advance allocated blocks may not be the most recently allocated blocks the in-advance allocated blocks may not be listed in the recent allocation list(s) 304.

The constructor 210 may therefore configure the allocation tracking code segment to further track, in runtime, allocation (and release) of one or more exploitation susceptible blocks which are allocated in advance for use by one or more of the vulnerable routines. Tracking the allocation of the exploitation susceptible blocks is done by the allocation tracking code segment very similarly to tracking the allocation of the most recently allocated blocks as described herein before. The exploitation susceptible blocks which are potentially allocated for use by one or more of the vulnerable routine(s) may be manually defined and/or automatically identified based on the analysis of the code file(s) as described herein above. For example, the constructor 210 may analyze the code file(s) to identify large memory blocks allocations conducted by the memory management routine(s). Such large allocated blocks may be highly susceptible to exploitation by the malware and the constructor may therefore designate such large allocated blocks as exploitation susceptible blocks. In another example, the exploitation susceptible blocks may be manually identified by the programmer, developer and/or the user of the code file(s).

The allocation tracking code segment may be configured to create, maintain and/or update, in runtime, a susceptible blocks list such as the recent allocation list(s) 304 which lists a subset of the memory blocks allocated in the dynamic memory 302. In particular, the allocation tracking code segment updates the susceptible blocks list to list at least some of the identified exploitation susceptible blocks allocated for use by one or more of the vulnerable routines. The susceptible blocks list may include a plurality of entries similar to the entries of the recent allocation list(s) 304 where each entry is associated with a respective exploitation susceptible block of the subset and comprises a pointer to the respective block, a size of the respective block and a unique marker generated for the respective block. The allocation tracking code segment may be further configured to insert the unique marker and optionally the size of each exploitation susceptible block in the dynamic memory 302 at the boundaries of the respective exploitation susceptible block as described for the recently allocated blocks.

As shown at 108, the constructor 210 may adjust the code file(s) by adjusting one or more of the vulnerable routines to invoke a memory integrity code segment. The memory integrity code segment is configured to check and validate, in runtime, memory integrity of memory blocks allocated in dynamic memory 302 after execution completion of the respective vulnerable routine. In particular, memory integrity code segment is configured to check and validate memory integrity of the subset of most recently allocated blocks and optionally the subset of exploitation susceptible blocks.

The memory integrity code segment may be configured to validate the memory integrity of an allocated block by verifying that no overrun has occurred to the allocated block. The memory integrity code segment may detect the overrun in the allocated block by detecting one or more write operations exceeding from the memory space of the allocated block(s) to the memory space of an adjacent block in the dynamic memory 302. The write operation(s) exceeding from the memory space of the allocated block(s) may overrun the boundary(s) of the allocated block and may therefore overrun (alter) the marker inserted at the boundary(s) memory location(s).

The constructor 210 may further configure the memory integrity code segment to disable context switches and/or interrupts upon invocation of the memory integrity code segment in order to prevent disruptions to the runtime operation of the memory integrity code segment. Such disruptions may be applied by the malware to intervene with the operation of the memory integrity code segment and may lead to failure of the memory integrity code segment to detect the overrun condition(s). As such, during runtime once invoked, the memory integrity code segment disables context switches and/or interrupts until it completes validating the allocated block(s).

During runtime, the memory integrity code segment may detect the overrun in the most recently allocated blocks by traversing the recent allocation list(s) 304 and validating memory integrity of each of the most recently allocated blocks listed in the recent allocation list(s) 304. The memory integrity code segment may validate the memory integrity of the most recently allocated blocks by comparing between the value of the unique marker inserted in a memory location at the boundary, specifically at the end of each recently allocated block and the value of the unique marker included in the respective entry in the recent allocation list(s) 304. The memory integrity code segment may compare the marker (which may be the unique marker or the size) inserted in the top boundary and/or the bottom boundary of the allocated blocks listed in the recent allocation list(s) 304. The marker inserted in the top boundary may allow the memory integrity code segment to detect forward overrun to one or more allocated blocks succeeding the respective recently allocated block while the marker inserted in the bottom boundary may allow the memory integrity code segment to detect backward overrun to one or more allocated blocks preceding the respective recently allocated block. As described herein before, in case the marker inserted by the allocation tracking code segment at the top boundary of one or more of the allocated blocks is the size, the allocation tracking code segment may have further encrypted the size such that the memory integrity code segment needs to first decrypt the encrypted size before validating it. This may prevent the malware from manipulating the size placed at the beginning address (top boundary) in a manner that may appear genuine and/or valid.

For each entry in the recent allocation list(s) 304, the memory integrity code segment may use the pointer extracted from the respective entry to identify the memory location of the marker located at the top boundary of the respective allocated block. To identify the memory location of the marker located at the bottom boundary of the respective allocated block, the memory integrity code segment may use the pointer extracted from the respective entry coupled with the size extracted from the respective entry to calculate the memory offset of the memory location at the bottom boundary.

The memory integrity code segment may further detect the overrun in the exploitation susceptible allocated blocks by traversing the susceptible blocks list and validating memory integrity of each of the exploitation susceptible allocated blocks listed in the susceptible blocks list. The memory integrity code segment may validate the memory integrity of the exploitation susceptible allocated blocks by comparing between the unique marker inserted at the end of each exploitation susceptible allocated block and the unique marker included in the respective entry in the susceptible blocks list.

In case of a match between the values of the unique marker, the memory integrity code segment may determine that no overrun occurred and the allocated block is valid. However, in case of no match the memory integrity code segment may determine that an overrun event took place potentially by a malware and may initiate one or more of the predefined actions.

The constructor may 210 adjust the code file(s) to invoke the memory integrity code segment at the end of the respective vulnerable routine such that the memory integrity code segment may be invoked after completion of execution of the normal functionality of the respective vulnerable routine.

Optionally, the constructor 210 adjusts the code file(s) to invoke the memory integrity code segment before invocation and execution of one or more of the vulnerable routines in order to detect a potential imminent write operation to be performed by the respective vulnerable routine(s) which may exceed from the memory space of one or more of the most recently allocated blocks listed in the recent allocation list(s) 304. The memory integrity code segment may be configured to detect the exceeding write operation by analyzing an address range which is transferred to the respective vulnerable routine for processing.

During runtime, based on the analysis, the memory integrity code may determine whether the transferred address range crosses the one or more of the boundaries of one or more of the block listed in the allocated blocks list(s). In case the memory integrity code segment determines that a write overrun is imminent, the memory integrity code segment may initiate one or more of the predefined actions.

Optionally, the constructor 210 adjusts the code file(s) to invoke the memory integrity code segment premeditatedly independently of execution of the vulnerable routine(s) in order to traverse the allocated blocks list(s) and verify that no overrun occurred in any of the allocated blocks listed in the allocated blocks list(s). Invoking the memory integrity code segment may be applied in one or more modes and/or implementations. For example, the constructor 210 may adjust one or more routines in the code file(s) to trigger invocation of the memory integrity code segment upon execution of this triggering routine(s). In another example, the constructor 210 may add one or more routines to the code file(s) to trigger invocation of the memory integrity code segment periodically and/or on request.

The constructor 210 may add the memory integrity code segment to the code file(s) using one or more of the code insertion (hooking) methods, techniques and/or implementations which may be selected according to the type of the code file(s).

For example, in case the adjusted code file is a source code file, the constructor 210 may adjust one or more of the vulnerable routines to invoke the memory integrity code segment following execution of the adjusted vulnerable routine(s). To apply the change(s) to the adjusted source file to include the memory integrity code segment in one or more of the vulnerable routines, the constructor 210 may add one or more source code files, shared libraries, static archives and/or the like to the build of the adjusted source code file.

In another example, in case the adjusted code file is an intermediate code file, the constructor 210 may insert a trampoline branch function configured to invoke the memory integrity code segment immediately following execution completion of the respective vulnerable routine, i.e. before return to the initiating (calling) routine which called the vulnerable routine. The constructor may 210 may add the trampoline branch function to be invoked instead of the respective vulnerable routine. The constructor 210 may apply this by replacing the address of the respective vulnerable routine in the symbol table with the address of the trampoline function. The trampoline branch function may be configured to first invoke the respective vulnerable routine and after the respective vulnerable routine completes its execution, the trampoline branch function may invoke the memory integrity code segment. In another example applicable for intermediate code files, the constructor 210 may add a branch instruction (e.g. BL) at the end of the adjusted vulnerable routine to invoke the memory integrity code segment from within the adjusted vulnerable routine following completion of the execution of the vulnerable routine. To apply the change(s) to the adjusted intermediate file to include the memory integrity code segment in one or more of the vulnerable routines, the constructor 210 may add one or more intermediate code files, shared libraries, static archives and/or the like to the build of the adjusted intermediate code file.

In another example, in case the adjusted code file is an executable code file, the constructor 210 may add the memory integrity code segment(s) by creating one or more dynamically preloaded libraries configured to replace one or more of the vulnerable routines when the executable code file(s) are loaded by the targeted processor(s). In particular, the constructor 210 may apply the dynamically preloaded libraries for replacing one or more vulnerable routines which are inherent to the execution environment, e.g. the operating system executed by the target processor(s), for example, memcpy( ) strcpy( ) Such inherent vulnerable routine(s) may typically be provided in one or more dynamically loadable shared libraries which may be mapped by the dynamically preloaded library(s) for replacing the inherent vulnerable routine(s). Each of the replacement vulnerable routine(s) may be configured to invoke the memory integrity code segment following execution completion of the respective inherent vulnerable routine. For example, assuming the code files are part of Linux operating system build, the constructor 210 may create one or more dynamically preloaded libraries provided, for example, in .so file(s) which may be preloaded in runtime using the 'LD_PRELOAD' environmental variable containing one or more paths to the shared libraries dynamically preloaded library(s).

Additionally, the constructor 210 may adjust the executable code file(s) to invoke the memory integrity code segment(s) for one or more vulnerable routines created by the programmer (developer) of the code file(s) which are hence not inherent to the execution environment (e.g. the operating system). The programmer may implement one or more of the non-inherent vulnerable routines in one or more dynamically loadable shared libraries as typically done for the inherent vulnerable routine(s). In such case, the constructor 210 may add the memory integrity code segment(s) by creating one or more dynamically preloaded libraries configured to replace one or more of the non-inherent vulnerable routines when the executable code file(s) is loaded by the targeted processor(s). However, the programmer may also implement one or more of the non-inherent vulnerable routines not to be loaded through dynamically loadable shared library(s), for example, as part of the main program. In this case, the constructor 210 may add the memory integrity code segment(s) and configure its invocation by inserting a branch instruction into the non-inherent vulnerable routine(s) at the end of the non-inherent vulnerable routine(s). To this end, the constructor 210 may first analyze the executable code file(s) and convert the machine code to respective assembly code, i.e. disassemble the machine code. After converted to assembly code, the constructor 210 may adjust the vulnerable routine(s) for hooking and invoking the memory integrity code segment as done for the intermediate code files, specifically, add a branch instruction (e.g. BL) at the end of one or more of the adjusted non-inherent vulnerable routines to invoke the memory integrity code segment from within the respective adjusted non-inherent vulnerable routine after execution completion of the adjusted vulnerable routine.

Optionally, the constructor 210 adjusts one or more critical routines identified in the intermediate code file(s) to invoke the memory integrity code segment prior to their execution in order to verify the dynamic memory 302 is not compromised before executing one of the critical routine(s). Each critical routine, when executed, may compromise an intended behavior of the device in a way that may lead to potentially hazardous, dangerous and/or harmful consequences and/or results. In particular, routines may be regarded and/or defined as critical in case the compromised intended behavior relates to interaction with one or more other parties, for example, people (e.g. user, patient, operator, etc.), devices, systems and/or the like such that the compromised intended behavior may affect, impact and/or harm the other party(s). For example, assuming the executable file is executed by a processor(s) controlling operation of an insulin pump. In such case routine(s) which controls insulin injection may be defined as critical. In another example, assuming the executable file is executed by a processor(s) controlling operation of a heart pacemaker. In such case routine(s) which controls electric pulse generation may be defined as critical. In another example, assuming the executable file is executed by a processor(s) controlling operation of a vehicle breaking system. In such case routine(s) which initiate breaking instructions to the vehicle's breaks may be defined as critical.

One or more of the critical routines may be manually defined as such by one or more users, experts, operators and/or the like. Additionally and/or alternatively, one or more of the critical routines may be automatically defined as such based on an analysis of the intermediate code file(s).

The constructor may 210 adjust the code file(s) to invoke the memory integrity code segment prior to execution of the respective critical routine. The constructor 210 may add the memory integrity code segment to the code file(s) using one or more of the code insertion (hooking) methods, techniques and/or implementations which may be selected according to the type of the code file(s).

For example, in case the adjusted code file is a source code file, the constructor 210 may adjust one or more of the critical routines to invoke the memory integrity code segment prior to execution of the adjusted critical routine(s).

In another example, in case the adjusted code file is a source code file, the constructor 210 may insert a trampoline branch function configured to invoke the memory integrity code immediately prior to execution of the respective critical routine, i.e. upon call of the respective critical routine from an initiating (calling) routine. The constructor 210 may apply this by replacing the address of the respective critical routine in the symbol table with the address of the trampoline function. After the memory integrity code is executed it may return to the trampoline branch function which may then invoke the respective critical routine. In another example applicable for intermediate code files, the constructor 210 may adjust one or more of the critical routine(s) to add a branch instruction (e.g. BL) at the beginning of the adjusted critical routine to invoke the memory integrity code segment from within the adjusted critical routine prior to execution of the critical routine.

In another example, in case the adjusted code file is an executable code file, the constructor 210 may add the memory integrity code segment(s) by creating one or more dynamically preloaded libraries configured to replace one or more of the critical routines when the executable code file(s) is loaded by the targeted processor(s). In particular, the constructor 210 may apply the dynamically preloaded libraries for replacing one or more critical routines which are inherent to the execution environment, e.g. the operating system executed by the target processor(s), for example, device drivers controlling an I/O interface(s) connected to a critical device and/or the like. Such inherent critical routine(s) may typically be provided in one or more dynamically loadable shared libraries which may be mapped by the dynamically preloaded library(s) for replacing the inherent vulnerable routine(s). Each of the critical routine(s) may be configured to invoke the memory integrity code segment prior to execution of the respective critical routine(s). For example, assuming the code files are part of Linux operating system build, the constructor 210 may create one or more dynamically preloaded libraries provided, for example, in .so file(s) which may be preloaded in runtime using the 'LD_PRELOAD' environmental variable containing one or more paths to the shared libraries dynamically preloaded library(s).

Additionally, the constructor 210 may adjust the executable code file(s) to invoke the memory integrity code segment(s) for one or more critical routines created by the programmer (developer) of the code file(s) which are hence not inherent to the execution environment (e.g. the operating system). The programmer may implement one or more of the non-inherent critical routines in one or more dynamically loadable shared libraries as typically done for the inherent critical routine(s). In such case, the constructor 210 may add the memory integrity code segment(s) by creating one or more dynamically preloaded libraries configured to replace one or more of the non-inherent critical routines when the executable code file(s) is loaded by the targeted processor(s). However, the programmer may also implement one or more of the non-inherent critical routines not to be loaded through dynamically loadable shared library(s), for example, as part of the main program. In this case, the constructor 210 may add the memory integrity code segment(s) and configure its invocation by inserting a branch instruction into the non-inherent critical routine(s) at the beginning of the non-inherent critical routine(s). To this end, the constructor 210 may first analyze the executable code file(s) and convert the machine code to respective assembly code, i.e. disassemble the machine code. After converted to assembly code, the constructor 210 may adjust the critical routine(s) for hooking and invoking the memory integrity code segment as done for the intermediate code files, specifically, add a branch instruction (e.g. BL) at the beginning of one or more of the adjusted non-inherent critical routines to invoke the memory integrity code segment from within the respective adjusted non-inherent critical routine prior to execution of the adjusted critical routine.

A shown at 110, the constructor 210 amends data, instruction(s), symbol table(s) and/or one or more attributes of the intermediate code file(s) affected by the adjustment of the intermediate code file(s) done to include the allocation tracking code segment(s), the memory integrity code segment(s), the recent allocation list(s) 304, the susceptible blocks list and/or the markers.

For example, the layout of one or more of the adjusted routines in the intermediate code file(s) as defined during the compilation of the intermediate code file(s) may change due to the insertion of the added code segments, the lists and/or the markers thus changing the relative locations of one or more instructions and/or data items in the adjusted routine(s). The constructor 210 may therefore analyze the disassembled code of the routine(s) to search for instructions and/or data items comprising reference(s) and/or pointer(s) to other instruction(s) and/or other data item(s). The constructor 210 may adjust the detected reference(s) and/or pointer(s) and update them according to the new layout of the routine(s) after insertion of the added code segments, the lists and/or the markers.

For example, assuming the intermediate code file(s) are compiled for the ARM architecture and instruction set, the constructor 210 may search for 'LDR Rn, [pc #offset]' which may be affected by the change of the routine's layout. The adjuster may then amend (update) the '#offset' according to the new layout of the adjusted routine to point to the correct location with respect to the 'pc' which is the program counter.

In another example, the constructor 210 may amend the symbol table of the adjusted routine(s) to reflect the changes applied to the adjusted routine(s) by the insertion of the added code segments, the lists and/or the markers. For example, the constructor 210 may update the symbol table to include the symbols of the added code segments. The constructor 210 may further amend the symbol table to reflect the address locations of the adjusted routine(s) which may have changed due to the insertion of the added code segments, the lists and/or the markers.

Moreover, the insertion of the added code segments as well as the insertion of the lists and/or the markers may inflate the size of the respective intermediate code file. The constructor 210 may therefore adjust the adjusted intermediate file(s) to amend one or more attributes of the adjusted intermediate code file(s), for example, the file size and/or the like. For example, assuming the intermediate code file(s) are in ELF format, the constructor 210 may adjust the header of the ELF file(s) to reflect the new offsets and alignments in the routine(s) of the intermediate code file(s) after the insertion of the added code segments, the lists and/or the markers.

The constructor 210 may include the added code segments, the lists and/or the markers in the adjusted code files(s) itself, for example, in the source code file(s) and/or the intermediate code file(s). Additionally and/or alternatively, the constructor 210 may include the added code segments, the lists and/or the markers in one or more additional code files, for example, one or more source code files and/or the one or more intermediate code files. The additional code file(s) may be provided together with the adjusted code file(s) for the compilation, generation, build and/or linkage of the executable file(s).

The constructor 210 may also verify that branches to the added code segments implemented are valid for build and/or linkage after the intermediate code file(s) are adjusted to reflect the changes implied by the insertion of the added code segments, the lists and/or the markers. For example, assuming the constructor 210 added the added code segments using the trampoline branch function(s), the constructor 210 may replace a relocation entry for each vulnerable memory management and/or critical routine adjusted to invoke the added code segment(s) to point to the respective trampoline branch function configured to invoke the respective added code segment where the relocation entry comprises a predefined name. The relocation entry may be replaced in the relocation section describing the relocations for code section(s) containing the branch function(s). If no such code section exists, the relocation entry may be created and added to the existing sections in the intermediate file. The added code segments may be compiled with the same predefined names in one or more of the additional intermediate code files created to include the added code segments.

A shown at 112, the constructor 210 may output the adjusted intermediate code file(s) which may be used for generating, building and/or linking one or more executable files which may be executed by one or more processors. For example, the constructor 210 may transmit the intermediate code file(s) to one or more of the remote networked resources which may use one or more applications, tools and/or the like, for example, a linker, a code builder and/or the like for creating the executable file(s) from the adjusted intermediate code file(s). In another example, the constructor 210 may store the intermediate code file(s) in the storage 206 from where the intermediate code file(s) may be retrieved by one or more applications, tools and/or the like, for example, a linker, a code builder and/or the like for creating the executable file(s). In another example, the constructor 210 may store the intermediate code file(s) in one or more of the attachable storage devices which may be attached to another system where the intermediate code file(s) may be retrieved by one or more applications, tools and/or the like, for example, a linker, a code builder and/or the like for creating the executable file(s).

It is expected that during the life of a patent maturing from this application many relevant systems, methods and computer programs will be developed and the scope of the terms intermediate code files format, intermediate code files analysis tools are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

In addition, any priority document(s) of this application is/are hereby incorporated herein by reference in its/their entirety.

What is claimed is:

1. A computer implemented method of generating code files adjusted to apply dynamic memory protection, comprising:

receiving at least one code file comprising a plurality of routines, the at least one code file was created for execution by at least one processor using a dynamic memory region supporting run-time dynamic allocation of memory blocks;

analyzing the at least one code file to identify at least one exploitation vulnerable routine of the plurality of routines, and adjusting the at least one code file to include an allocation tracking code segment configured to maintain at least one recent allocation list to track, in runtime, a subset comprising a limited number of most recently allocated blocks of a plurality of blocks dynamically allocated in the dynamic memory region, each of the most recently allocated blocks is associated in the at least one recent allocation list with a pointer to the respective most recently allocated block, at least one of a plurality of markers inserted in the dynamic memory region in at least one boundary of the respective most recently allocated block and a size of the respective most recently allocated block;

adjusting the at least one code file to include a memory integrity code segment invoked upon execution completion of the at least one exploitation vulnerable routine, the memory integrity code segment is configured to detect a write operation exceeding from a memory space of at least one most recently allocated block of the subset of most recently allocated blocks to a memory space of at least one block adjacent to the at least one most recently allocated block, the exceeding write operation is detected using at least one of the plurality of markers, the memory integrity code segment identifies the subset of most recently allocated blocks by traversing the at least one recent allocation list; and outputting the at least one adjusted code file;

wherein in runtime, in case the exceeding write operation is detected, the memory integrity code segment causes the at least one processor to initiate at least one predefined action, wherein the at least one recent allocation list is maintained by at least one adjusted memory management routine of the plurality of routines configured to conduct at least one memory allocation operation which is a member of a group consisting of: allocating a block in the dynamic memory region and releasing a block in the dynamic memory region, the at least one adjusted memory management routine is adjusted to invoke the allocation tracking code segment added to the at least one code file, the allocation tracking code segment is configured to:
add a newly allocated block to the at least one recent allocation list upon allocation of the newly allocated block by:
updating the at least one recent allocation list to add an entry for the newly allocated block, the added entry associates the newly allocated block with a respective unique marker, a pointer to the newly allocated block and a size of the newly allocated block, and
inserting the respective unique marker in at least one boundary of the newly allocated block; and
remove an allocated block from the at least one recent allocation list by:
validating the removed allocated block by determining whether an exceeding write operation occurred to the memory space of the removed allocated block by comparing between a respective unique marker inserted in the at least one boundary of the removed allocated block and the respective unique marker associated with the removed allocated block in the at least one recent allocation list, and
removing the entry mapping the removed allocated block from the at least one recent allocation list.

2. The method of claim 1, wherein the at least one code file is a source code file adjusted prior to compilation by a compiler adapted to create at least one respective intermediate code file used for generation of at least one respective executable code file for execution by the at least one processor.

3. The method of claim 1, wherein the at least one code file is an intermediate code file generated by a compiler prior to generation of at least one respective executable code file for execution by the at least one processor, the at least one intermediate code file is a member of a group consisting of: an object file and an archive file.

4. The method of claim 1, wherein the at least one code file is an executable file comprising machine code generated for execution by the at least one processor.

5. The method of claim 1, wherein each of the plurality of routines is a member of a group consisting of: a routine, a sub-routine and a function.

6. The method of claim 1, wherein the at least one exploitation vulnerable routine is manually defined by at least one expert, the expert is a member of a group consisting of: a developer, an operator and a user.

7. The method of claim 1, wherein the at least one exploitation vulnerable routine is automatically defined based on the analysis of the at least one code file.

8. The method of claim 1, wherein the exceeding write operation is detected by checking a data overrun in a memory location in which the at least one marker is inserted.

9. The method of claim 1, wherein in case the at least one code file is an intermediate code file, the memory integrity code segment is added by adding a trampoline branch function which is invoked instead of the at least one exploitation vulnerable routine and configured to first invoke the at least one exploitation vulnerable routine followed by invocation of the memory integrity code segment after the at least one exploitation vulnerable routine completes execution.

10. The method of claim 1, wherein in case the at least one code file is an intermediate code file, the memory integrity code segment is added by adding a branch instruction at the end of the at least one exploitation vulnerable routine to invoke the memory integrity code segment immediately after the at least one exploitation vulnerable routine completes execution.

11. The method of claim 1, wherein in case the at least one code file is an executable code file, the memory integrity code segment is added by creating at least one dynamically preloaded library configured to include a replacement routine for the at least one exploitation vulnerable routine, the replacement routine is configured to first invoke the at least one exploitation vulnerable routine followed by invocation of the memory integrity code segment after the at least one exploitation vulnerable routine completes execution.

12. The method of claim 1, wherein the memory integrity code segment is added to at least one memory management routine inherent to an operating system executed by the at least one processor.

13. The method of claim 1, wherein the memory integrity code segment is further configured to invoke prior to invocation of the at least one exploitation vulnerable routine to detect an imminent write operation by the at least one exploitation vulnerable routine which potentially exceeds from the memory space of at least one most recently allocated block of the subset of most recently allocated blocks, the memory integrity code segment detects the imminent write operation by analyzing an address range transferred to the at least one exploitation vulnerable routine for processing to determine whether the transferred address range crosses the at least one boundary.

14. The method of claim 1, further comprising the subset of most recently allocated blocks includes all blocks allocated in the dynamic memory region.

15. The method of claim 1, wherein context switches and interrupts are disabled upon invocation of the memory integrity code segment.

16. The method of claim 1, wherein a maximum number of most recently allocated blocks listed in the at least one recent allocation list is predefined.

17. The method of claim 1, wherein the memory integrity code segment detects the exceeding write operation by detecting that the value of the at least one marker inserted in the dynamic memory region in the at least one boundary of the most recently allocated block does not match the value of the at least one marker associated with the most recently allocated block in the at least one recent allocation list.

18. The method of claim 1, wherein the allocation tracking code segment is further configured to insert the size of the newly allocated block in at least one boundary of the newly allocated block to serve as another one of the plurality of markers.

19. The method of claim 1, wherein the respective unique marker is randomly selected for the allocated block upon the allocation.

20. The method of claim 1, wherein in case an allocation of another newly allocated block is required while the at least one recent allocation list is full, the allocation tracking code segment removes a least recently allocated block from the at least one recent allocation list by:
validating the least recently allocated block, and
removing the entry mapping the least recently allocated block from the at least one recent allocation list.

21. The method of claim 20, wherein the allocation tracking code segment is further configured to:

replace the respective unique marker located in the at least one boundary of the least recently allocated block with a global marker, the global marker is randomly selected during at least one of: every startup event of the at least one processor and every initiation of at least one process by the at least one processor, and insert a size of the least recently allocated block in a top boundary of the least recently allocated block.

22. The method of claim 20, wherein the allocation tracking code segment is further configured to validate each released allocated block which is not listed in the at least one recent allocation list by determining whether an exceeding write operation occurred to the memory space of the released allocated block based on verification of the global marker inserted in the at least one boundary of the released block, the allocation tracking code segment retrieves the global marker using the size of the released allocated block inserted in the top boundary of the released allocated block.

23. The method of claim 1, wherein in case the at least one code file is an intermediate code file, the allocation tracking code segment is added by adding a trampoline branch function which is invoked instead of the at least one memory management routine and configured to invoke the allocation tracking code segment prior and following execution of the at least one memory management routine.

24. The method of claim 1, wherein in case the at least one code file is an intermediate code file, the allocation tracking code segment is added by adding a branch instruction at the beginning and at the end of the at least one memory management routine to invoke the allocation tracking code segment at the start of and at the end of execution of the at least one memory management routine.

25. The method of claim 1, wherein in case the at least one code file is an executable code file, the allocation tracking code segment is added by creating at least one dynamically preloaded library configured to include a replacement routine for the at least one memory management routine, the replacement routine is configured to invoke the allocation tracking code segment prior and following execution of the at least one memory management routine.

26. The method of claim 1, wherein the memory integrity code segment is further configured to detect, upon execution completion of the at least one exploitation vulnerable routine, a write operation exceeding from a memory space of one of a subset of exploitation susceptible blocks of the plurality of blocks to a memory space of an adjacent one of the plurality of blocks using at least one of the plurality of markers, each of the subset of exploitation susceptible blocks was previously allocated in the dynamic memory for use by the at least one exploitation vulnerable routine.

27. The method of claim 26, wherein the subset of exploitation susceptible blocks is listed in a susceptible blocks list, each of the exploitation susceptible blocks is associated in the susceptible blocks list with a pointer to the respective exploitation susceptible block, a respective one of the plurality of markers and a size of the respective exploitation susceptible block, wherein a maximum number of exploitation susceptible blocks listed in the susceptible blocks list is predefined.

28. The method of claim 1, further comprising adjusting the at least one code file to invoke execution of the memory integrity code segment prior to invocation of at least one critical routine.

29. The method of claim 1, wherein the at least one predefined action is a member of a group consisting of: crashing execution of the at least one processor, halting execution of the at least one processor, causing the at least one processor to branch to a predefined address, preventing the at least one processor from executing at least one potentially malicious code instruction and generating an indication of a dynamic memory overrun.

30. The method of claim 1, further comprising, in case the at least one code file is an intermediate code file, the at least one intermediate code file is adjusted to amend at least one of: an instruction and a data element affected by the inclusion of the code segments.

31. The method of claim 1, further comprising, in case the at least one code file is an intermediate code file, the at least one intermediate code file is amended to update its symbol table to reflect the inclusion of the code segments and an increase to size of the adjusted routines.

32. A system for generating code files adjusted to apply dynamic memory protection, comprising:

a tangible storage device storing a program code; and at least one hardware processor coupled to the tangible storage device for executing the stored program code, the program code comprising:

code instructions to receive at least one code file comprising a plurality of routines, the at least one code file was created for execution by at least one processor using a dynamic memory region supporting run-time dynamic allocation of memory blocks;

code instructions to analyze the at least one code file to identify at least one exploitation vulnerable routine of the plurality of routines, code instructions to adjust the at least one code file to include an allocation tracking code segment configured to maintain at least one recent allocation list to track, in runtime, a subset comprising a limited number of most recently allocated blocks of a plurality of blocks dynamically allocated in the dynamic memory region, each of the most recently allocated blocks is associated in the at least one recent allocation list with a pointer to the respective most recently allocated block, at least one of a plurality of markers inserted in the dynamic memory region in at least one boundary of the respective most recently allocated block and a size of the respective most recently allocated block;

code instructions to adjust the at least one code file to include a memory integrity code segment invoked upon execution completion of the at least one exploitation vulnerable routine, the memory integrity code segment is configured to detect a write operation exceeding from a memory space of at least one most recently allocated block of the subset of most recently allocated blocks to a memory space of at least one block adjacent to the at least one most recently allocated block, the exceeding write operation is detected using at least one of the plurality of markers, the memory integrity code segment identifies the subset of most recently allocated blocks by traversing the at least one recent allocation list, and code instructions to output the at least one adjusted code file;

wherein in runtime, in case the exceeding write operation is detected, the memory integrity code segment causes the at least one processor to initiate at least one predefined action, wherein the at least one recent allocation list is maintained by at least one adjusted memory management routine of the plurality of routines configured to conduct at least one memory allocation operation which is a member of a group consisting of: allocating a block in the dynamic memory region and releasing a block in the dynamic memory region, the at least one adjusted memory management routine is adjusted to invoke the allocation tracking code segment added to the at least one code file, the allocation tracking code segment is configured to:

add a newly allocated block to the at least one recent allocation list upon allocation of the newly allocated block by:
  updating the at least one recent allocation list to add an entry for the newly allocated block, the added entry associates the newly allocated block with a respective unique marker, a pointer to the newly allocated block and a size of the newly allocated block, and
  inserting the respective unique marker in at least one boundary of the newly allocated block; and
remove an allocated block from the at least one recent allocation list by:
  validating the removed allocated block by determining whether an exceeding write operation occurred to the memory space of the removed allocated block by comparing between a respective unique marker inserted in the at least one boundary of the removed allocated block and the respective unique marker associated with the removed allocated block in the at least one recent allocation list, and
  removing the entry mapping the removed allocated block from the at least one recent allocation list.

33. A computer program product implemented with dynamic memory protection, comprising:
  a non-transitory computer readable storage medium; and
  a plurality of program instructions each of a respective one of a plurality of routines of an executable file generated from at least one adjusted code file for execution by at least one processor using a dynamic memory region supporting run-time dynamic allocation of memory blocks, the at least one adjusted code file is adjusted to include an allocation tracking code segment and a memory integrity code segment, the allocation tracking code segment is configured to maintain at least one recent allocation list to track, in runtime, a subset comprising a limited number of most recently allocated blocks of a plurality of blocks dynamically allocated in the dynamic memory region, the memory integrity code segment invoked upon execution completion of at least one exploitation vulnerable routine of the plurality of routines is configured to detect a write operation exceeding from a memory space of at least one most recently allocated block of the subset of most recently allocated blocks of the plurality of blocks dynamically allocated in the dynamic memory region to a memory space of at least one block adjacent to the at least one most recently allocated block, the exceeding write operation is detected using at least one of a plurality of markers inserted in the dynamic memory region in at least one boundary of each of the most recently allocated blocks of the subset of most recently allocated blocks;
  wherein the memory integrity code segment identifies the subset of most recently allocated blocks by traversing the at least one recent allocation list;
  wherein in runtime, in case the exceeding write operation is detected, the memory integrity code segment causes the at least one processor to initiate at least one predefined action;
  wherein each of the most recently allocated blocks is associated in the at least one recent allocation list with a pointer to the respective most recently allocated block, at least one of the plurality of markers inserted in the dynamic memory region in at least one boundary of the respective most recently allocated block and a size of the respective most recently allocated block;
    wherein the plurality of program instructions are executed by the at least one processor from the non-transitory computer readable storage medium,
    wherein the at least one recent allocation list is maintained by at least one adjusted memory management routine of the plurality of routines configured to conduct at least one memory allocation operation which is a member of a group consisting of: allocating a block in the dynamic memory region and releasing a block in the dynamic memory region, the at least one adjusted memory management routine is adjusted to invoke the allocation tracking code segment added to the at least one code file, the allocation tracking code segment is configured to:
  add a newly allocated block to the at least one recent allocation list upon allocation of the newly allocated block by:
    updating the at least one recent allocation list to add an entry for the newly allocated block, the added entry associates the newly allocated block with a respective unique marker, a pointer to the newly allocated block and a size of the newly allocated block, and
    inserting the respective unique marker in at least one boundary of the newly allocated block; and
  remove an allocated block from the at least one recent allocation list by:
    validating the removed allocated block by determining whether an exceeding write operation occurred to the memory space of the removed allocated block by comparing between a respective unique marker inserted in the at least one boundary of the removed allocated block and the respective unique marker associated with the removed allocated block in the at least one recent allocation list, and
  removing the entry mapping the removed allocated block from the at least one recent allocation list.

* * * * *